United States Patent
Miyazakii et al.

(10) Patent No.: US 7,197,080 B2
(45) Date of Patent: Mar. 27, 2007

(54) TRANSMISSION APPARATUS AND COMMUNICATION SYSTEM USING THE SAME

(75) Inventors: Tomiya Miyazakii, Fukuoka (JP); Nobutaka Kodama, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/185,032

(22) Filed: Jul. 20, 2005

(65) Prior Publication Data

US 2006/0018399 A1    Jan. 26, 2006

(30) Foreign Application Priority Data

Jul. 22, 2004    (JP) .............................. 2004-214059

(51) Int. Cl.
H04L 27/00    (2006.01)
(52) U.S. Cl. ..................................... 375/259
(58) Field of Classification Search ................ 375/259, 375/227, 228, 295, 296, 377; 340/500; 370/229

See application file for complete search history.

(56) References Cited

U.S. PATENT DOCUMENTS

| | | | |
|---|---|---|---|
| 5,497,398 A | | 3/1996 | Tzannes et al. |
| 5,499,396 A | * | 3/1996 | Reime ......................... 455/266 |
| 5,631,610 A | | 5/1997 | Sandberg et al. |
| 5,636,246 A | | 6/1997 | Tzannes et al. |
| 5,903,594 A | | 5/1999 | Saulnier et al. |
| 5,991,269 A | | 11/1999 | Williamson et al. |
| 5,995,539 A | | 11/1999 | Miller |
| 6,229,432 B1 | | 5/2001 | Fridley et al. |
| 6,434,119 B1 | | 8/2002 | Wiese et al. |
| 6,442,129 B1 | | 8/2002 | Yonge, III et al. |
| 6,456,192 B1 | | 9/2002 | Bullock et al. |

(Continued)

FOREIGN PATENT DOCUMENTS

EP    1039715    9/2000

(Continued)

OTHER PUBLICATIONS

International Search Report dated Nov. 21, 2005.
H. Malvar, "Signal Processing with Lapped Transforms," Artech House, Inc., Norwood, MA, ISBN 089006-467-9, 44 pages total, 1992.

*Primary Examiner*—Pankaj Kumar
(74) *Attorney, Agent, or Firm*—Stevens, Davis, Miller & Mosher, LLP

(57) ABSTRACT

A characteristic value information retriever 9 retrieves characteristic value information FD2 indicative of another characteristic value which should be newly set as to a transmission signal SS, and a characteristic value modificator 9 controls a characteristic value determinator 8 in such a manner that such a characteristic value which has been set is changed into another characteristic value which is indicated by the acquired characteristic value information FD2 and the changed characteristic value is set. As a consequence, since the characteristic value is changed into another characteristic, the characteristic value of the transmission signal SS can be easily changed without changing the circuit arrangement of the transmission apparatus. For instance, even in such a case that the characteristic value which should be set is changed due to a change of a restricted content in connection with an alteration of a law, and due to a change in use area of the transmission apparatus, the transmission apparatus can be properly adapted to this change in a flexible manner.

20 Claims, 15 Drawing Sheets

U.S. PATENT DOCUMENTS

| | | |
|---|---|---|
| 6,532,256 B2 | 3/2003 | Miller |
| 6,549,520 B1 | 4/2003 | Gross et al. |
| 6,944,232 B2 | 9/2005 | Koga et al. |
| 2001/0033612 A1 | 10/2001 | Peeters |
| 2003/0057529 A1 | 3/2003 | Ikenaga |
| 2003/0156014 A1 | 8/2003 | Kodama et al. |
| 2004/0057529 A1 | 3/2004 | Koga et al. |
| 2004/0098172 A1 | 5/2004 | Deck et al. |
| 2005/0008086 A1 | 1/2005 | Koga et al. |
| 2005/0031048 A1 | 2/2005 | Koga et al. |
| 2005/0035850 A1 | 2/2005 | Schwager et al. |
| 2005/0037722 A1 | 2/2005 | Koga et al. |
| 2005/0190785 A1 | 9/2005 | Yonge, III et al. |

FOREIGN PATENT DOCUMENTS

| | | |
|---|---|---|
| EP | 1089453 | 4/2001 |
| EP | 1398885 | 3/2004 |
| JP | 2000165304 | 6/2000 |
| JP | 2000278237 | 10/2000 |
| JP | 2003218831 | 7/2003 |
| JP | 2005253076 | 9/2005 |
| WO | 03063380 | 7/2003 |

* cited by examiner

FIG. 6

| AREA | FREQUENCY BAND |
|------|----------------|
| AR1  | $\Delta f1$    |
| AR2  | $\Delta f2$    |
| AR3  | $\Delta f3$    |
| ⋮    | ⋮              |

FIG. 16

ADT

| AREA (AR) | IP ADDRESS (IPA) |
|---|---|
| AR1 | IPA1 |
| AR2 | IPA2 |
| AR3 | IPA3 |
| ⋮ | ⋮ |

TRANSMISSION APPARATUS AND COMMUNICATION SYSTEM USING THE SAME

BACKGROUND

1. Field of the Invention

The present invention relates to a transmission apparatus for outputting input data as a transmission signal. More specifically, the present invention is directed to a transmission apparatus and a communication system using the transmission apparatus, in which even when a characteristic value is changed which should be set as to a transmission signal, the transmission apparatus and the communication system are capable of being properly adapted to the change of the characteristic value to be set in a flexible manner without altering a circuit arrangement of the transmission apparatus.

2. Description of the Related Art

Very recently, while various sorts of communication methods such as wireless LANs (Local Area Networks) have been used, power line communications capable of utilizing power lines as network transfer paths have been proposed (for example, Japanese Laid-open Patent Application No. 2000-165304). In these communication methods, characteristic values indicative of physical characteristics (for instance, frequency bands and power levels) as to transmission signals outputted from transmission apparatus have been restricted based upon various sorts of laws (for instance, Japanese "DEMPA" law). The contents of these restrictions are made different from each other in correspondence with areas such as "counties." Thus, technical specifications of these transmission apparatus have seen previously set in such a manner that characteristic values of transmission signals may be properly adapted to contents of restrictions established in correspondence with use areas.

However, while characteristic values which should be set are not always constant, there are some cases that these characteristic values are changed due to alterations of restricted contents made in connection with alterations of laws, and/or due to changes in use areas of transmission apparatus. As a result, for example, in such a case that a frequency band which should be set is changed, a band rejection filter must he newly added to a transmission apparatus. That is, since there are some cases that circuit arrangements of transmission apparatus must be changed, there is such a problem that these transmission apparatus cannot be properly adapted to the changed restricted contents in a flexible manner.

More specifically, in power line communications (PLC), there are some possibilities that these power line communications utilize frequency bands which are used by the presently existing communication systems, for example, amateur radio communications and shortwave broadcasting. As a result, it is required to avoid interference occurred between these presently existing communication systems and the above-described power line communications, so that various sorts of limitations have been made as to contents of restrictions such as frequency bands and allowable electric field strengths. As a consequence, even in such a case that the above-explained various sorts of limitations have be additionally conducted to the restricted contents, such transmission apparatus capable of being properly adapted in a flexible manner to changes in characteristic values which should be set has been desirably expected.

A problem to be solved is given as follows: That is, in the case that a characteristic value is changed which should be set as to a transmission signal, since a circuit arrangement of a transmission apparatus must be changed, the transmission apparatus cannot be properly adapted to the change in the characteristic value to be set in a flexible manner.

SUMMARY

A major feature of the present invention is given as follows: That is, in a transmission apparatus of the present invention, a characteristic value retriever retrieves characteristic value information indicative of another characteristic value, which should be newly set as to a transmission signal; and a characteristic value modificator controls a characteristic value determinator in such a manner that a characteristic value which has been set is changed into another characteristic value which is indicated by the retrieved characteristic value information so as to set the changed characteristic value.

In the transmission apparatus of the present invention, since the characteristic value information of the characteristic value is retrieved which should be newly set as to the transmission signal, the characteristic value of the transmission signal which has been set is changed into the characteristic value which should be newly set so as to set the changed characteristic value. As a result, even in such a case that such a characteristic value which should be set is changed, the transmission apparatus can easily change the characteristic value of the transmission signal without changing the circuit arrangement of the transmission apparatus. As a consequence, for example, even in such a case that the a content of a restriction is changed in connection with an alteration of a law, and/or the use area of the transmission apparatus is changed, the transmission apparatus can be properly adapted in the flexible manner to the change in the characteristic value which should be set.

BRIEF DESCRIPTION OF THE DRAWINGS

FIG. 6 is a diagram for representing an example of a content of a frequency band table.

FIG. 16 is a diagram for indicating one example of a content of an address table.

DETAILED DESCRIPTION

Figure 1:
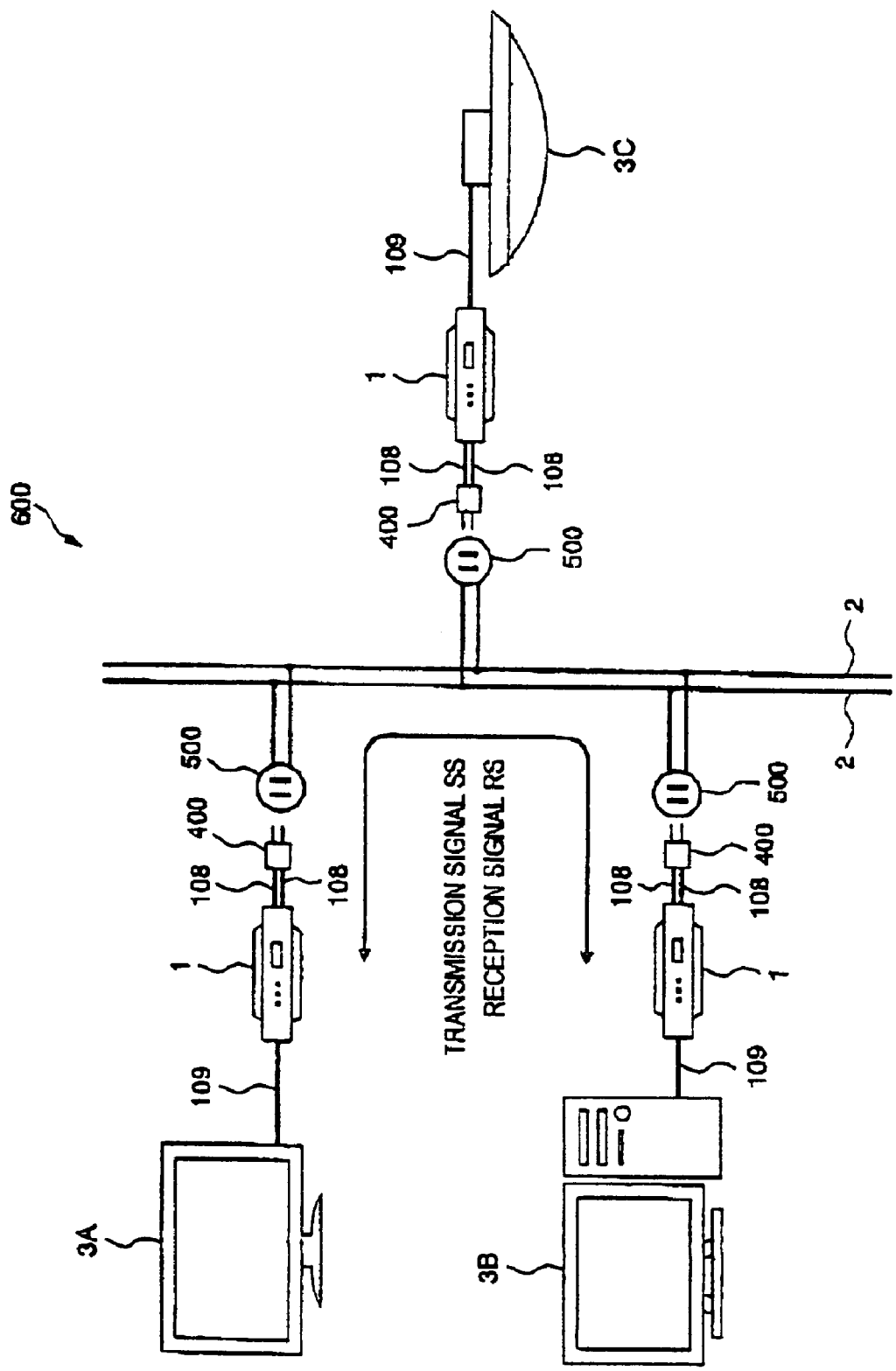
FIG. 1 is an explanatory diagram for schematically explaining a home-use network using a communication apparatus.

First invention which has been made to solve the above-described problem is featured by such a transmission apparatus (1) for outputting input data (SD) as a transmission signal (SS), comprising:

a characteristic value determinator (8) for setting a characteristic value (for example, $\Delta f1$) indicative of a physical characteristic (for example, frequency band) of the transmission signal (SS);

a transmitting signal generator (5) for generating a transmission signal (SS) of the characteristic value ($\Delta f1$) set by the characteristic value determinator (8) from the input data (SD), and for outputting the generated transmission signal (SD);

a characteristic value retriever (9) for retrieving characteristic value information (for example, FD2) indicative of another characteristic value (for example, $\Delta f2$); and a characteristic value modificator (9) for controlling the characteristic value determinator (8) in such a manner that the characteristic value ($\Delta f1$) set by the characteristic value determinator (9) is changed to another characteristic value ($\Delta f2$) indicated by the characteristic value information (FD2) acquired by the characteristic value retriever (9) so as to set the changed characteristic value.

With employment of this arrangement, since the characteristic value information of the characteristic value which should be newly set as to the transmission signal is retrieved, the characteristic value of the transmission signal which has been set is changed into the characteristic value which should be newly set and this changed characteristic value is set. As a result, even in such a case that the characteristic value which should be set is changed, the characteristic value of the transmission signal can be easily changed without changing the circuit arrangement of the transmission apparatus. As a result, for instance, even in such a case that the characteristic value which should be set is changed due to a change of a restricted content in connection with an alteration of a law, and due to a change in use areas of the transmission apparatus, the transmission apparatus can be properly adapted to this change in a flexible manner.

Second invention which has been made to solve the above-described problem is featured by that the characteristic value determinator (8) sets a frequency band of the transmission signal (SS) to (for example, $\Delta f1$);

the transmitting signal generator (5) is comprised of:

a sub-carrier selector (51) for selecting a sub-carrier (for example, SC2, SC3) within the frequency band ($\Delta f1$) set by the characteristic value determinator (8);

a bit-data generator (51) for generating a plurality of bit data (BL) from the input data (SD); and a symbol mapper (51) for mapping the respective bit data (BL) generated by the bit-data generator (51) with respect to digital modulated (for example, PAM) symbols; and the transmitting signal generator (51) maps the symbol data (PD) mapped by the symbol mapper (51) only to the sub-carrier (SC2, SC3) selected by the sub-carrier selector (51) so as to generate the transmission signal (SS), and outputs the generated transmission signal (SS);

the characteristic value retriever (9) retrieves characteristic value information (FD2) indicative of another frequency band (for example, $\Delta f2$); and in which:

the characteristic value modificator (9) controls the characteristic value determinator (9) in such a manner that the frequency band ($\Delta f1$) set by the characteristic value determinator (9) is changed into another frequency band ($\Delta f2$) which is indicated by the characteristic value (FD2) retrieved by the characteristic value determinator (9) so as to set the changed frequency band ($\Delta f2$).

With employment of this arrangement, since the characteristic information of the frequency band which should be newly set is retrieved, the frequency band of the transmission signal is changed to be set, so that the communication apparatus can be properly adapted to the change in the frequency band which should be set in the flexible manner without additionally employing the band rejection filter. As a result, even when the communication apparatus is arranged in such a manner that this communication apparatus can be used in a plurality of areas, such band rejection filters whose filter coefficients are different from each other with respect to each of the areas (for example, every country) are no longer prepared. As a result, it is possible to avoid that the circuit scale as to the communication apparatus is increased. Also, in the case that the communication apparatus is operated in a high speed, it can avoid that power consumption is increased because the band rejection filter is additionally provided.

Third invention which has been made to solve the above-described problem is featured by that the transmitting signal generator (5) is further comprised of:

a wavelet inverse transformer (52) for wavelet-transforming the symbol data (PD) which has been mapped only to the sub-carrier (for example, SC2, SC3) selected by the sub-carrier selector (51) so as to produce temporal waveform series data (TD); and the transmitting signal generator (5) generates the transmission signal (SS) from the temporal waveform series data (TD) generated by the wavelet inverse transformer (52), and outputs the generated transmission signal (SS).

With employment of this arrangement, since the frequency band of the transmission signal is changed and set by utilizing the OFDM (Orthogonal Frequency Division Multiplex) modulating method with employment of the wavelet inverse transformation, such a calculation process that a complex number calculation is required in a Fourier inverse transformation can be carried out only by a real number calculation, so that a total calculation process amount can be reduced, as compared with that of the OFDM modulating method using the Fourier inverse transformation. As a consequence, the circuit scale as to the communication apparatus can be reduced.

Fourth invention which has been made to solve the above-described problem is featured by that the characteristic value determinator (8) sets a power level of the transmission signal (SS);

the transmission signal generator (5) is further comprised of:

an amplifier (54) for controlling the power level of the transmission signal (SS) to the power level set by the characteristic value determinator (8); and the transmission signal generator (5) generates a transmission signal (SS)

having the power level controlled by the amplifier (54) from the input data (SD), and outputs the generated transmission signal (SS);

the characteristic value retriever (9) retrieves characteristic value information indicative of another power level; and in which:

the characteristic value modificator (9) controls the characteristic value determinator (8) in such a manner that the power level set by the characteristic value determinator (8) is changed into another power level which is indicated by the characteristic value information acquired by the characteristic value retriever (9).

With employment of this arrangement, since the characteristic value information of the power level which should be newly set is acquired, the power level of the transmission signal is changed to be set. As a consequence, even in such a case that the power level which should be set is changed, the transmission apparatus can be properly adapted to this power level change in the flexible manner.

Fifth invention which has been made to solve the above-described problem is featured by that the transmitting signal generator (5) outputs the generated transmission signal (SS) via a power line (for example, 2)

With employment of this arrangement, since the characteristic value as to the transmission signal outputted via the power supply line can be easily changed, even when various sorts of limitations are additionally conducted to the restricted contents related to the frequency bands and the allowable electric field strengths, the communication apparatus can be properly adapted to these restricted contents in the flexible manner. As a result, even in such a case that the communication apparatus uses such frequency bands which are utilized in the presently existing communication systems such as, for example, amateur radio communications and shortwave broadcasting systems, the interference with respect to these presently existing communication systems can be firmly prevented.

Sixth invention which has been made to solve the above-described problem is featured by that the transmission apparatus (1) is further comprised of:

a transmitter memory (10) for storing thereinto a characteristic value information table (FDT) which causes the characteristic value information (for example, FD) to correspond to an area (AR); and the characteristic value retriever (9) retrieves the characteristic value information (FD2) which corresponds to the use area (for example, AD2) of the transmission apparatus from the characteristic information table (FDT).

With employment of this arrangement, since the characteristic value information corresponding to the use area of the transmission apparatus is retrieved from the characteristic value information table, the user of the transmission apparatus no longer checks the characteristic values which should be set as to the respective areas, and thus, the cumbersome operation by the user can be reduced.

Seventh invention which has been made to solve the above-described problem is featured by that the transmission apparatus (1) is further comprised of:

a signal input unit (11) for accepting a signal for designating the use area (for example, AR2) of the transmission apparatus (1); and the characteristic value retriever (9) retrieves characteristic value information (FD2) which corresponds to the area (AR2) designated via the signal input unit (11) from the characteristic value information table (FDT).

With employment of this arrangement, since the user of the transmission apparatus manipulates the signal input unit, the user can designate the area of the characteristic value information which is retrieved from the characteristic value information table. As a result, the degree of freedom may be set to be changing/setting operation of the characteristic value, and the transmission apparatus can be properly adapted to the request of the user in the flexible manner.

Eighth invention which has been made to solve the above-described problem is featured by that the transmission apparatus (1) is further comprised of:

an area information checker (9) for monitoring area information (for example, IPA) which indicates the use area (for example, AR2) of the transmission apparatus (1); and in the case that the area information (IPA) of the transmission apparatus (1) monitored by the area information checker (9) is updated as (or example, IPA2), the characteristic value retriever (9) retrieves characteristic value information which corresponds to an area (for example, AP2) of the area information (IPA2) from the characteristic value information table (FDT).

With employment of this arrangement, in the case that the area information (for example, IP address) indicative of the use area of the transmission signal is updated, the characteristic value of the transmission signal is changed to be set. As a result, the characteristic value can be automatically changed to be set without giving the cumbersome operation to the user of the transmission apparatus.

Ninth invention which has been made to solve the above-described problem is featured by such a communication system equipped with a server (30) and the transmission apparatus (1) recited in any one of Claim 1 to Claim 5, which is freely connected to a network (21), in which:

the server (30) is comprised of:

a server memory (32) for storing thereinto the characteristic value information table (FDT) which causes the characteristic value information (for example, FD) to correspond to the area (AR); and a characteristic value transmitter (33) for reading out the characteristic value information (FDT) corresponding to the use area (for example, AR2) of the transmission apparatus (1) from the characteristic value table (FD2), and transmits the read characteristic value information (FD2) to the characteristic information retriever (9) of the transmission apparatus (1).

With employment to this arrangement, the server stores the frequency band table and transmits the frequency band data corresponding to the use area of the communication apparatus to the communication apparatus, so that the frequency bands as to the respective areas can be managed on the side of the server. As a consequence, for instance, since the latest frequency band in each of the areas is prepared, even in such a case that the restricted content is changed in connection with the alteration of the law, the present frequency band can be changed so as to set a proper frequency band.

Tenth invention which has been made to solve the above-described problem is featured by that the transmission apparatus (1) is freely connected via a gateway (22) to the network (21);

the server (30) is comprised of:

an area information checker (34) for monitoring area information (for example, IPA) set to the gateway (22); and in the case that the area information (IPA) of the gateway (22) monitored by the area information checker (34) is updated (for example, to IPA2), the characteristic value transmitter (33) of the server (30) reads out characteristic information (FD2) which corresponds to an area (AR2) of the area information (IPA2) from the characteristic value table (FDT) as characteristic value information (FD2) which corresponds to the use area of the transmission apparatus (1), and the characteristic value transmitter (33) transmits the read characteristic value information on (FD2) to the characteristic value retriever (9) or the transmission apparatus (1).

With employment of this arrangement, the transmission value of the transmission signal is changed to be set by using the area information set in the gateway. As a consequence, the area information indicative of the use area of the transmission apparatus need not be monitored with respect to the transmission apparatus, and thus, the degree of freedom for the monitoring subject can be widened.

It should be understood that reference numerals shown in brackets merely indicate relevant elements in the drawings in order to readily understand the present invention for the sake of convenience. Therefore, the above-descriptions are not limited only to the descriptions represented in the drawings, and thus, the technical scope of the present invention must not be interpreted based upon the descriptions of these reference numerals.

Next, embodiment modes of the present invention will now be described with reference to FIG. 1 to FIG. 14.

FIG. 1 is an explanatory diagram for schematically showing a home-use network 600 with employment of a communication apparatus 1. The home-use network 600 corresponds to a LAN (Local Area Network) constructed in a home. It should be noted that tie LAN need not be always constructed inside a home, but may be arranged inside an office, and a facility (hospital, school etc.). The home-use network 600 contains a power line 2 of a commercial power supply. Various sorts of domestic electric appliances have been connected via a communication apparatus 1 to the power line 2. In FIG. 1, a television 3A, a personal computer (will be referred to as a "PC" hereinafter) 3B, an illumination 3C, and the like have been connected to the power line 2 as the domestic electric appliances 3.

Figure 2:
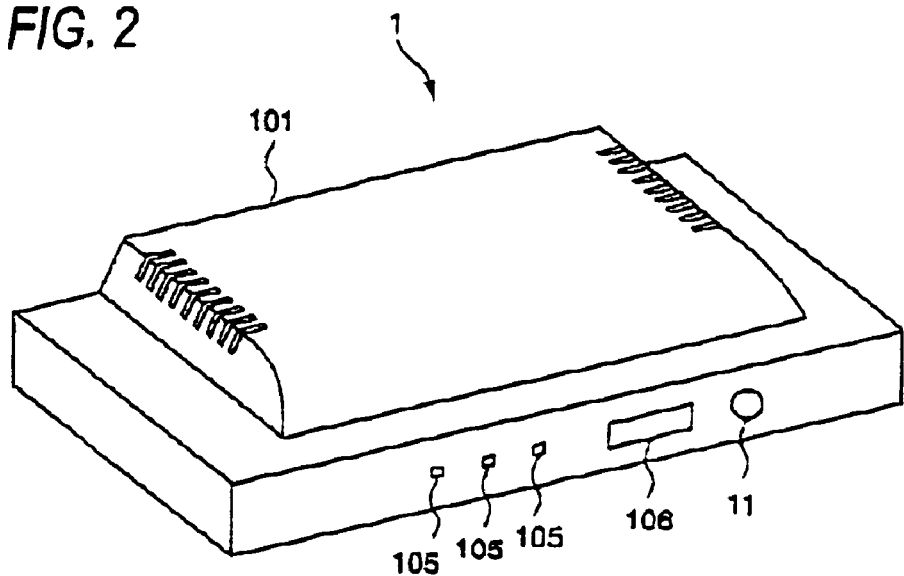
FIG. 2 is a perspective view for showing an outer appearance of a front surface of the communication apparatus.
Figure 3:
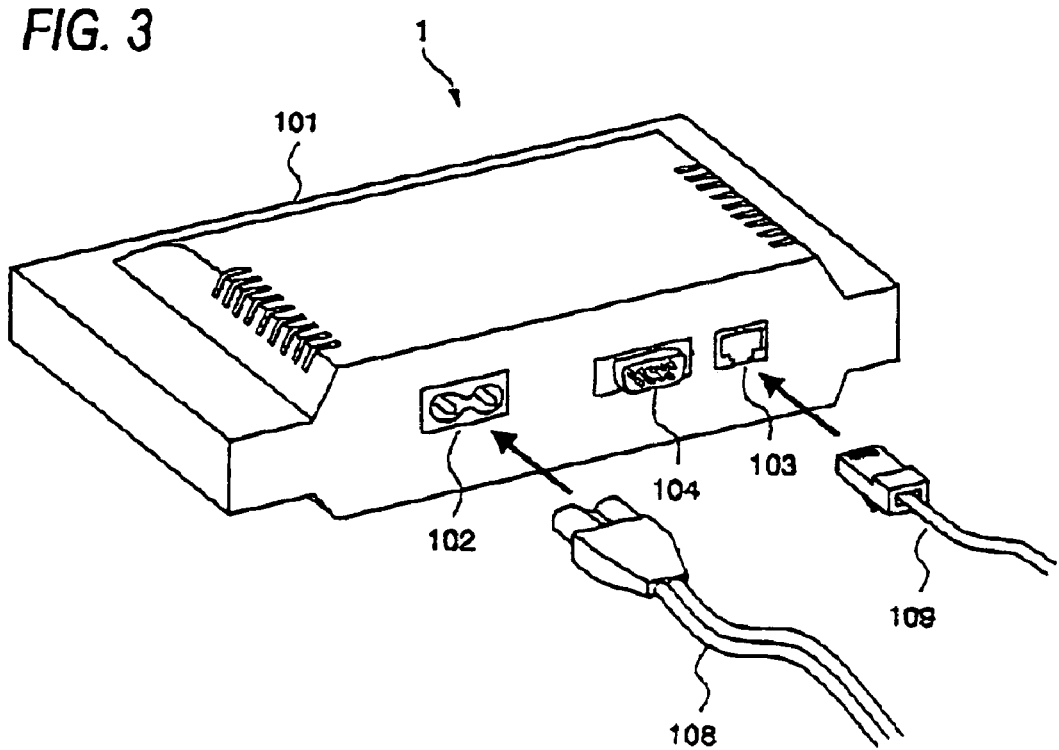
FIG. 3 is a perspective view for representing an outer appearance of a rear surface of the communication apparatus.

FIG. 2 is a perceptive view for showing an outer appearance of a front surface of the communication apparatus 1. FIG. 3 is a perspective view for representing an outer appearance of a rear surface of the communication apparatus 1. The communication apparatus 1 according to an embodiment mode of the present invention corresponds to a modem as indicated in FIG. 2 and FIG. 3. The communication apparatus 1 has contained a housing 101. As shown in FIG. 3, a light emitting unit 105 constituted by an LED (Light Emitting Diode), a display unit 106 arranged by a liquid crystal display (LCD), or an organic EL (Electro-Luminescence), and a switch 11 have been provided on a front surface of the housing 101.

As represented in FIG. 3, a power supply connector 102, a LAN-purpose modular jack 103 such RJ45, and a D-sub connector 104 have been provided on a rear surface of the housing 101. As indicated in FIG. 3, a parallel cable 108 is connected to the power supply connector 102. A LAN cable 109 is connected to the modular jack 103. A D-sub cable (not shown) is connected to the DSub connector 104.

It should be also noted that although the modem of FIG. 2 and FIG. 3 has been indicated as one example of the communication apparatus 1, this communication apparatus 1 may be alternatively realized by a mobile communication terminal, for example, a portable telephone and a PDA (Personal Digital Assistant) if a communication function is equipped with such a mobile communication terminal, namely this communication apparatus 1 need not be always realized by the modem. Alternatively, the communication apparatus 1 may be realized by an electric appliance containing a modem, while this electric appliance corresponds to such a domestic electric appliance as a DVD recorder, and a set-top box. As previously explained, the communication apparatus 1 according to this embodiment mode corresponds to such a modem which performs a communication by using the power line 2 as a transfer path (namely, power line communication, PLC: Power Line Communication). It should be understood that this modem will be referred to as a "PLC adaptor" hereinafter.

Figure 4:
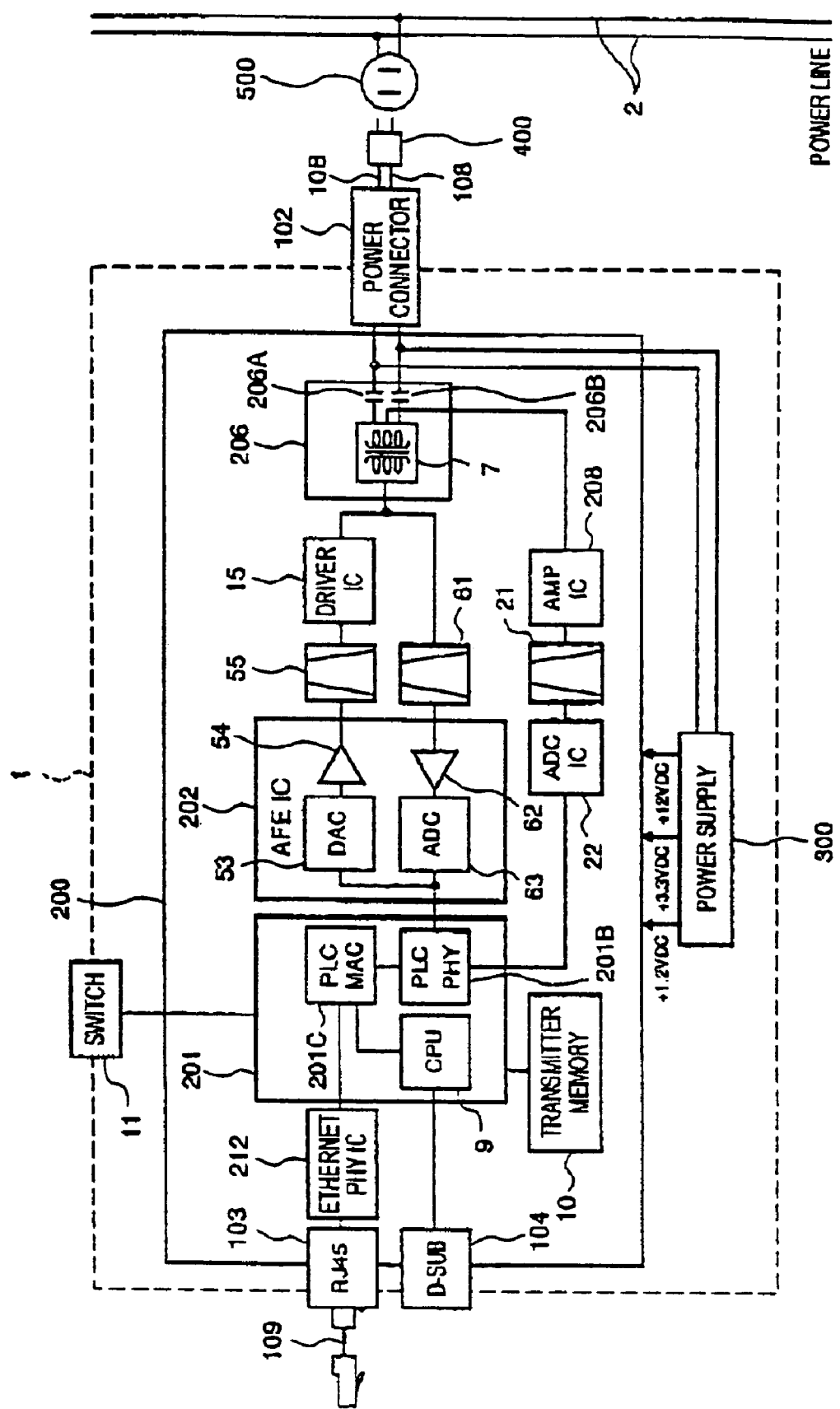
FIG. 4 is a block diagram for indicating one example of hardware of a PLC adaptor.

FIG. 4 is a block diagram for indicating one example of hardware of the PLC adaptor 1. As indicated in FIG. 4, the PLC adaptor 1 has contained a circuit module 200, a switching power supply 300, and the switch 11. The switching power supply 300 applies various sorts of voltages (for instance, +1.2 V, +3.3 V, and +12 V) to the circuit module 200. In this module 200, a main IC 201, and AFEφIC Analog Front End•IC) 202, a bandpass filter 55, a driver IC 15, a coupler 206, another bandpass filter 61, an AMP (Amplifier) •IC 208, another bandpass filter 21, an ADC (A/D converter) •IC 22, a transmitter memory 10, and an Ethernet PHY•IC 212 have been provided. The power supply connector 102 is connected via a plug 400 and a plug socket 500 to the power line 2.

The main IC 201 has been constituted by a CPU (Central Processing Unit) 9, a PLC•MAC (Power Line Communication•Media Access Control layer) block 201C, and a PLC•PHY (Power Line Communication•Physical layer) block 201B. The CPU 9 has mounted thereon a 32-bit RISC (Reduced Instruction Set Computer) processor. The PLC•MAC block 201C manages MAC layers as to a transmission signal and a reception signal whereas the PLC•PHY block 210B manages PHY layers as to a transmission signal and a reception signal. The AFE•IC 202 has been constituted by a D/A converter (DAC) 53, an A/D converter (ADC) 63, and amplifiers 54 and 62. The coupler 206 has been arranged by a coil transformer 7, and coupling purpose capacitors 206A and 206B. The transmitter memory 10 may be constituted by such a memory as a ROM (Read-Only Memory) and a RAM (Random Access Memory).

(Embodiment Mode 1)

FIG. 1 is a functional block diagram for indicating an example of the PLC adaptor (namely, communication apparatus) 1. As previously explained with reference to FIG. 1, the PLC adaptor 1 has been connected via the parallel cable 108 to the power line 2, and has been connected via the LAN cable 109 to the television 3A. In other words, the PLC adaptor 1 relays the power line 2 to the television 3A. The power line 2 corresponds to such a parallel cable which transfers thereto a voltage for example, AC 100 V) of a commercial power supply. It should also be noted that the power line 2 which is employed in the power line communication need not be always a power line of a commercial power supply, but may be realized by a power line of a DC power supply by which AC 100 V has been converted into a DC voltage.

The PLC adaptor 1 has contained a transmitter 5, a receiver 6, a coupler 7, a controller 8, a CPU 9, a transmitter memory 10, and the switch 11. As shown in an upper broken line frame of FIG. 5, the transmitter 5 has contained a mapping unit 51 including a serial-to-parallel converter, a wavelet inverse transmitter 52, a D/A converter 53, an amplifier 54, and a bandpass filter 55. As indicated in a lower broken line frame of FIG. 5, the receiver 6 has contained a bandpass filter 61, a gain amplifier 62, an A/D converter 63, a wavelet transformer 64, and a demapper 65.

It should also be noted that as to the controller 8, the mapping unit 51, the wavelet inverse transformer 52, the wavelet transformer 64, and the demapper 65, the PLC·PHY block 201B of the main IC 201 shown in FIG. 4 may function. Also, the transmitter 5 may function as one example of a transmitting signal generator. The controller 8 may function as one example of a characteristic value determinator. The CPU 9 may function as one example of a characteristic value retriever, a characteristic value modificator, and an area information checker. The mapping unit 51 may function as one example of a sub-carrier selector, a bit-data generator, and a symbol mapping unit.

With employment of the above-described arrangements, communication operations executed by the PLC adaptor 1 will now be described.

A frequency band table FDT shown in FIG. 6 has been previously stored in the transmitter memory 10 of the PLC adaptor 1. FIG. 6 is a schematic diagram for indicating an example of a content of the frequency band table FDA. The frequency band table FDT has stared thereinto frequency band data FD which correspond to areas "AR" respectively. The frequency band data FD indicate frequency bands "Δf" (for example, 0.1 to 0.2 Krad/s [=0.1 π to 0.2 πKHz]).

Concretely speaking, the frequency band data FD1, FD2, FD3, - - - , show frequency bands Δf1, Δf2, Δf3, , - - - , respectively, and these frequency band data Δf1, Δf2, Δf3, - - - , correspond to area AR1, AR2, AR3, - - - , respectively. Also, the areas "AR" indicate, for example, "countries." In other words, the frequency band table FDT represents frequency bands which can be used in power line communications in accordance with legal restrictions of the respective countries. It should be understood that the areas "AR" need not always correspond to "countries", but may correspond to, for example, "states" in USA if usable frequency bands correspond to different regions.

Also, use area data "ARD" have been stored in the transmitter memory 10, while these use area data "ARD" show areas where the PLC adaptor 1 is used (will be simply referred to as "use areas" hereinafter). In this example, it is so assumed that the PLC adaptor 1 is under use in, for example, the area "AR1", and the use area data "ARD" indicative of the area "AR1" has been stored as default.

Figure 5:
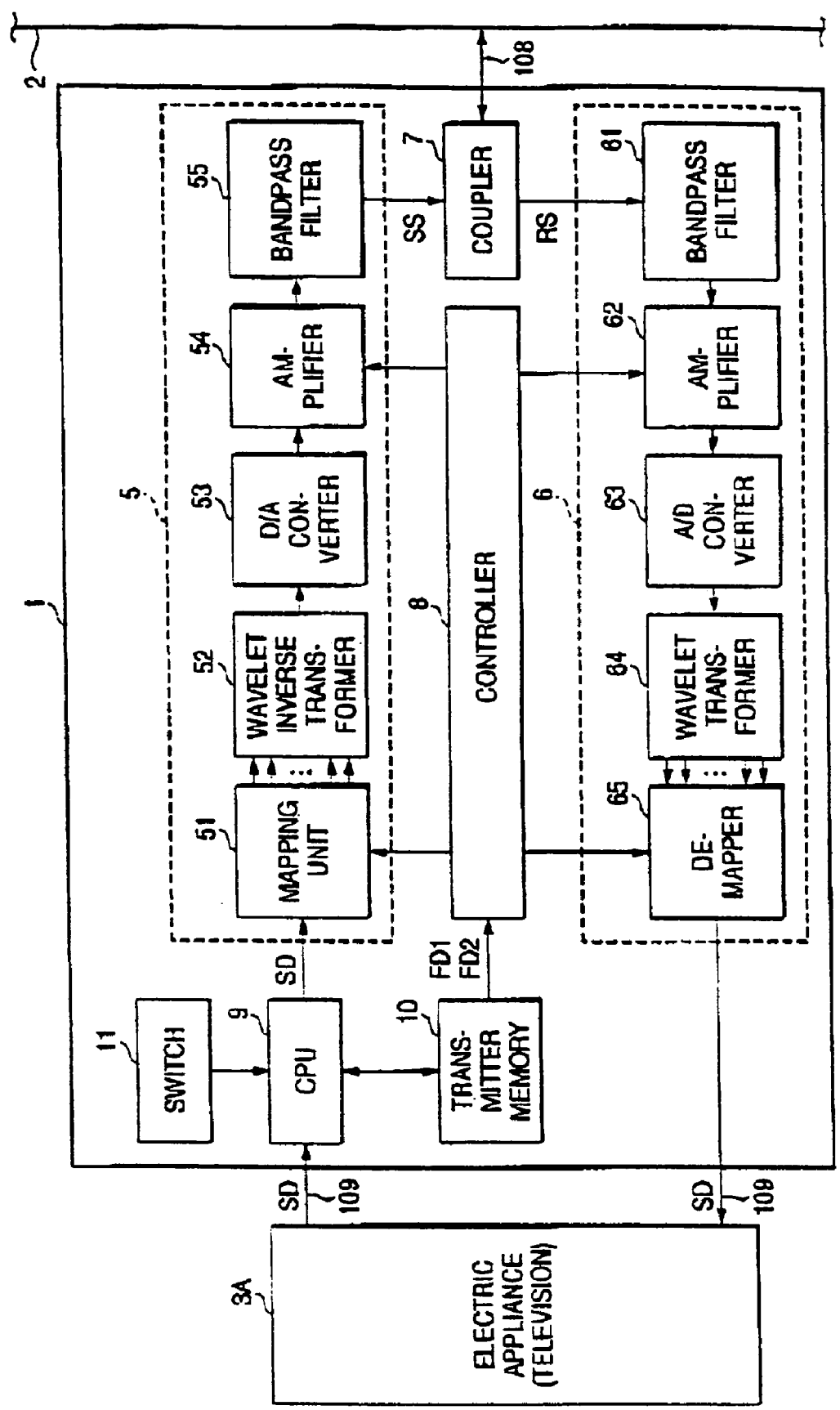
FIG. 5 is a functional block diagram for representing one example of the PLC adaptor.

When the communication operation is commenced (for instance, when the PLC adaptor 1 is initiated), the controller 8 reads out the use area data "ARD" which has been stored in the transmitter memory 10 and then, retrieves the frequency band data "FD" which corresponds to the area "AR1" indicated by this read use area data "ARD" from the transmitter memory 10. As Indicated in FIG. 6, since the frequency band data FD corresponding to the area "AR1" corresponds to "FD1", the controller 8 retrieves the frequency band data FD1 from the transmitter memory 10 as indicated in FIG. 5. As shown in FIG. 6, the retrieved frequency band data "FD1" indicates the frequency band "Δf1", the controller 8 instructs the mapping unit 51 of the transmitter 5 in such a manner that a sub-carrier "SC" corresponding to the frequency band "Δf1" is selected from a plurality of sub-carriers "SC" (will be explained later). In other words, the frequency band "Δf" may be set to "Δf1."

Figure 7:
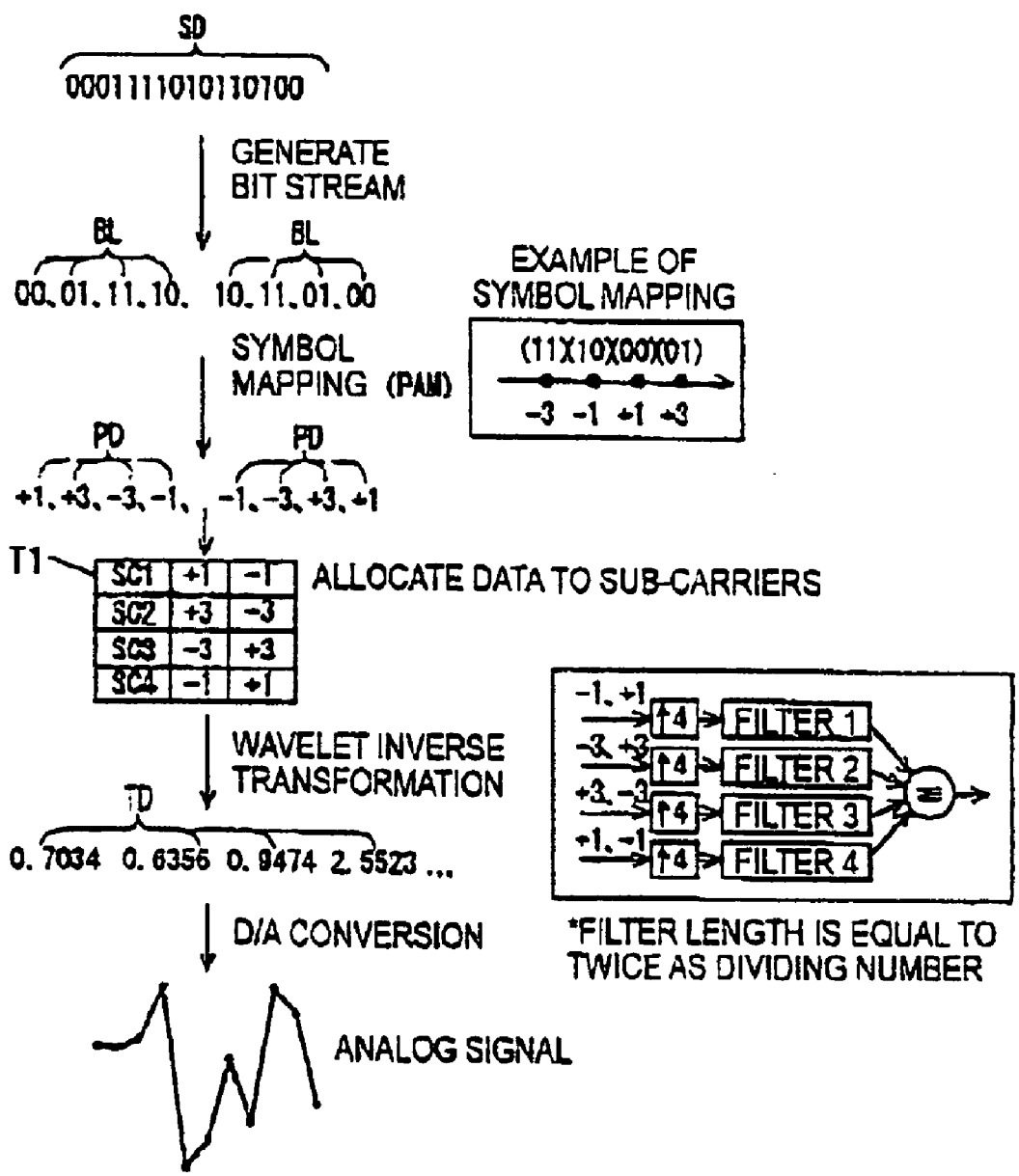
FIG. 7 is an explanatory diagram for explaining an example of transmission operation, namely, a diagram for representing a flow of transmission data.
Figure 8:
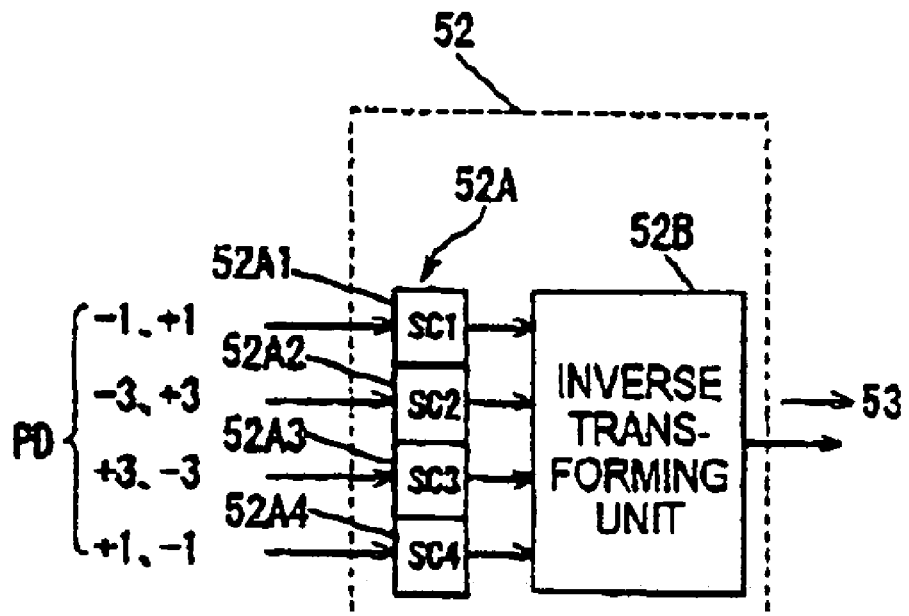
FIG. 8 is a explanatory diagram for explaining an example of the transmission operation, namely, a block diagram for showing an example of a wavelet inverse transformer.
Figure 9:
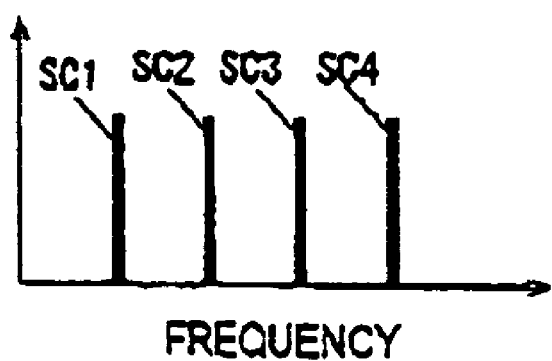
FIG. 9 is an explanatory diagram for explaining an example of the transmission operation, namely, a diagram for showing an example of sub-carriers.

Next, the PLC adaptor 1 performs a communication operation based upon the set frequency band "Δf1." Then, a description is made of the communication operation of the PLC adaptor 1 with reference to FIG. 5 to FIG. 9. FIG. 7 is an explanatory diagram for explaining an example of transmission operation, namely a diagram or indicating flows of transmission "SD." FIG. 8 is an explanatory diagram for showing one example of the transmission operation, namely FIG. 8 is a block diagram for indicating an example of the wavelet inverse transformer 52. FIG. 9 is an explanatory diagram for indicating an example of the transmission operation, namely a diagram for indicating an example of the sub-carrier "SC."

In the case tat a transmission operation is carried out, as indicated in FIG. 5, the television 3A outputs the transmission data "SD" to the PLC adaptor 1. As indicated in an upper portion of FIG. 7, the transmission data SD is indicated by, for example, "0001111010110100." When the transmission data SD is inputted to the PLC adaptor 1, this transmission data SD is entered via the CPU 9 of the PLC adaptor 1 to the mapping unit 51 of the transmitter 5.

The mapping unit 51 produces a plurality of bit streams BL having proper lengths from the inputted transmission data SD. For example, the mapping unit 51 divides the transmission data SD "0001111010110100" into "00", "01", "11", "10", "10", "11", "01", and "00", namely every 2 bits, as indicated in the upper portion of FIG. 7, so as to produce the plural bit streams BL. Then, the mapping unit 51 maps the produced bit streams BL to symbols of PAM (Pulse Amplitude Modulation) respectively so as to produce symbol data "PD."

As indicated in a right portion of FIG. 7, the respective bit streams BL of "11", "10", "00, and "01" correspond to symbols of "−3", "−1", "+1", and "+3" respectively. As a result, the mapping unit 51 maps the produced bit streams BL of "00", "01", "11", "10", "11", "01", and "00" to such symbols of "+1", "+3", "−3", "−1", "−1", "−3", "+3" and "+1" so as to produce symbol data "PD." When the symbol data "PD" is produced, the mapping unit 51 inputs the produced symbol data "PD" into the wavelet inverse transformer 52. It should also be understood that if a digital modulation does not employ a wavelet transformation, then this digital modulation is not especially limited only to the PAM (Pulse Amplitude Modulation), but may be alliteratively realized by, for example, the BPSK (Binary Phase Shift Keying), the QPSK (Quadrature Phase Shift Keying), and the QAM (Quadrature Amplitude Modulation) methods.

As indicated in FIG. 8, the wavelet inverse transformer 52 is arranged by an input unit 52A and an inverse transforming unit 52B. The input unit 52A is constituted by a plurality of input units 52A1, 52A2, - - - , whose total number is equal to a total number of the sub-carriers "SC." It should also be noted that a total number of the sub-carriers SC may be freely set within a range of power of 2 in the wavelet transforming stage. However, in this embodiment mode 1, for the sake of simple explanation, while such a wavelet transform for dividing the frequency band "Δf" by 4 is used, as shown in FIG. 9, the total number of these sub-carriers SC is selected to be 4 sub-carriers of "SC1", "SC2", "SC3", and "SC4." That is to say, as indicated in FIG. 8, the input unit 52A of the wavelet inverse transformer 52 has been constituted by 4 sets of input units 52A1, 52A2, 52A3, and 52A4, which correspond to the sub-carriers of SC1, SC2, SC3, and SC4, respectively.

Also, it should be understood that a filter length may be equal to such a value obtained by multiplying the total number of the sub-carriers SC by an integer, and may be freely set within a range similar to that for the total number of the sub-carriers SC. In this embodiment mode 1, it is so assumed that while such a filter length two time larger than the total number of the sub-carriers SC is employed, the wavelet transforming operation is carried out by employing two symbol data PD.

The produced symbol data PD are inputted to these four input units 52A1, 52A3, 52A3, and 52A4. Concretely speaking, for instance, as indicated in a table "T1" of FIG. 7, it is so assumed that "+1", "+3", "−3", and "−1" corresponding to a front stage (namely, left portion of FIG. 7) of the symbol data PD are allocated to the sub-carriers of SC1, SC2, SC3, and SC4, and furthermore, "−1", "−3", "+3", and "+1" corresponding to a rear stage (namely, right portion of FIG. 7) of this symbol data PD are allocated thereto. As a result, as indicated in FIG. 8, the mapping unit 51 inputs the symbol data of "+1" and "−1" into the input unit 52A1; inputs the symbol data of "+3" and "−3" into the input unit 52A2; inputs the symbol data of "−3" and "+3" into the input unit 52A3; and inputs the symbol data or "−1" and "+1" into the input unit 52A4. Namely, the respective symbol data PD may be mapped to the sub-carriers of SC1, SC2, SC3, and SC4.

The input unit 52A outputs the entered respective symbol data PD to the inverse transforming unit 52B. The inverse transforming unit 52B performs the wavelet inverse transforming operation with respect to the respective symbol data PD which have been mapped to the sub-carriers SC1, SC2, SC3, and SC4 so as to produce temporal sampling values of the transmission waveform on the time axis within 1 symbol time period, and then, outputs temporal waveform series data TD "0.7034", "0.6356", "0.9474", "2.5523", - - - . The D/A converter 53 D/A-converts these temporal waveform series data TD into analog temporal waveform series signals, and then, outputs these analog signals in a constant sampling time.

The amplifier 54 amplifies the outputted transmission waveforms up to transmission signal levels, and the bandpass filter 55 eliminates an unnecessary frequency component therefrom, and thus, outputs the filtered signal as a transmission signal "SS" as represented in FIG. 5. The coupler 7 outputs the transmission signal SS to the power line 2, the waveform of which has been shaped by the bandpass filter 55.

On the other hand, in the case that a reception operation is carried out, when it is so assumed that for example, the PC (personal computer) 3B shown in FIG. 1 transmits a transmission signal SS via the power line 2 to the television 3A, the coupler 7 receives the transmission signal SS from the power line 2 as a reception signal RS, and then, outputs this reception signal RS to the receiver 6 as shown in FIG. 5. The bandpass filter 61 of the receiver 6 eliminates noise signals outside the relevant band from the inputted reception signal RS. While the converting gain has been set to the amplifier 62, this amplifier 62 adjusts the signal level or the reception signal RS based upon this set converting gain in such a manner that the adjusted signal level may be stored in the dynamic range of the A/D converter 63. The A/D converter 63 samples the signal waveform of the reception signal RS whose signal level has been adjusted at the same timing as the sampling timing of the transmitter side so as to produce a digital signal of this reception signal RS.

The wavelet transformer 64 performs the wavelet transforming operation with respect to the digital waveform data of the reception signal RS so as to obtain symbol data PD of the sub-carriers SC1, SC2, SC3, and SC4. The demapper 65 demaps these symbol data PD, and restores the demapped symbol data PD into the most approximate bit stream BL so as to obtain reception data "RD." Then, as shown in FIG. 1, the demapper 65 outputs this reception data RD to the electric appliance 3, and thus, the reception operation is carried out by the PLC adaptor 1. It should also be noted that the PLC adaptor 1 need not always perform the reception operation, but may simply function as a transmitter.

Figure 10:
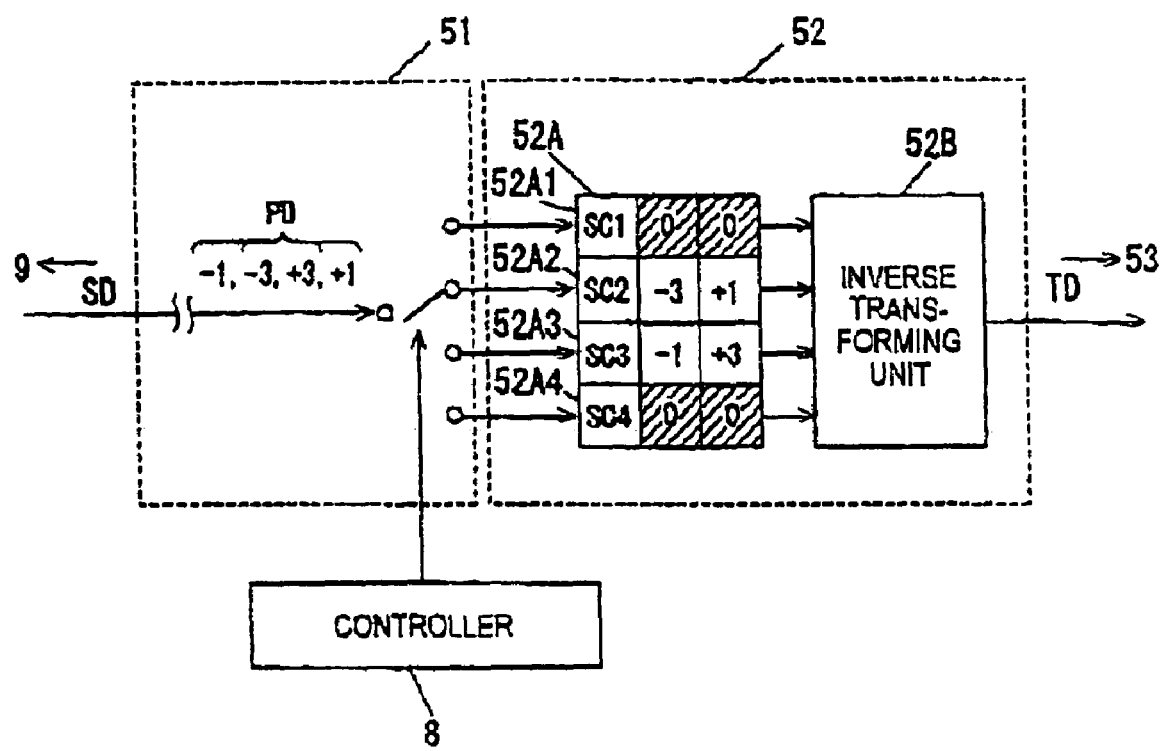
FIG. 10 is an explanatory diagram for indicating an example of a control unit for selecting a sub-carrier.
Figure 11:
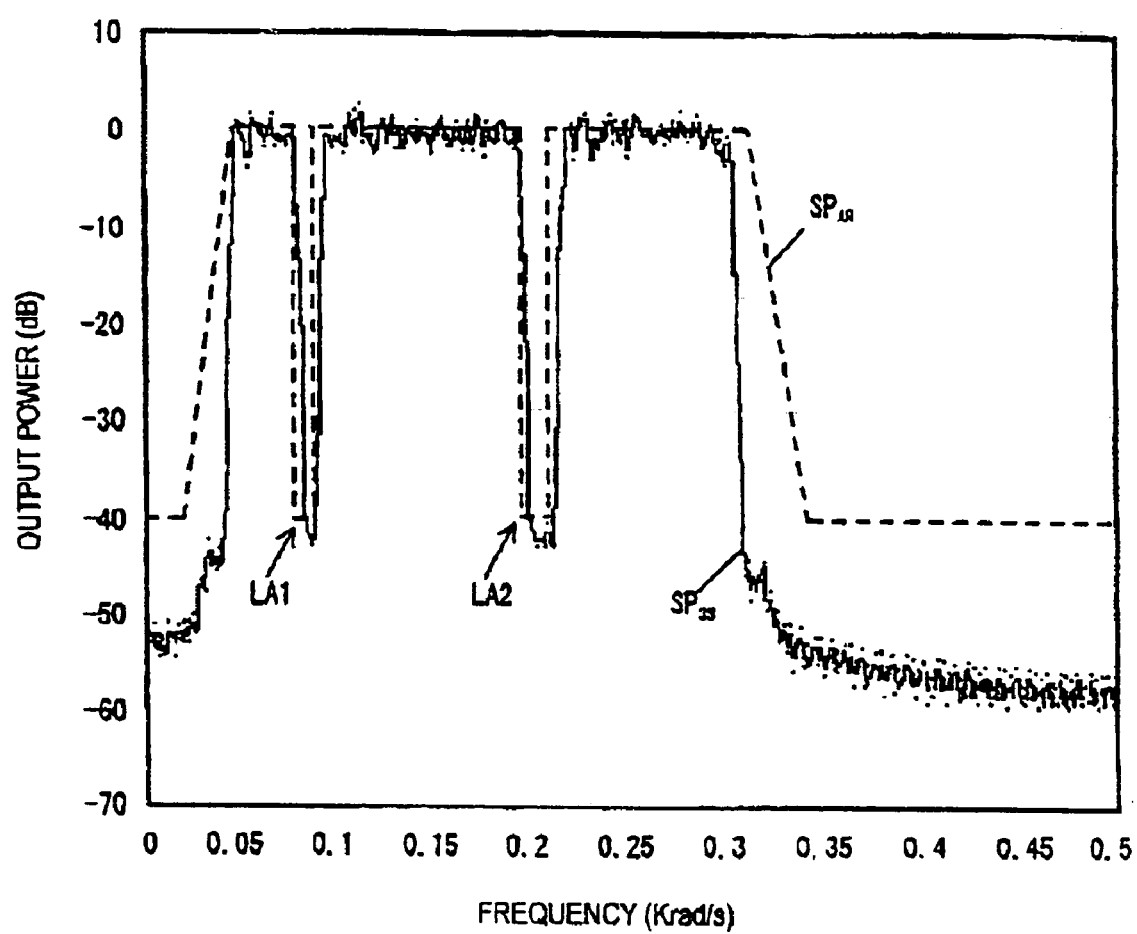
FIG. 11 is a diagram for graphically representing one example of a frequency spectrum in the case that a frequency band is changed to be set.
Figure 12:
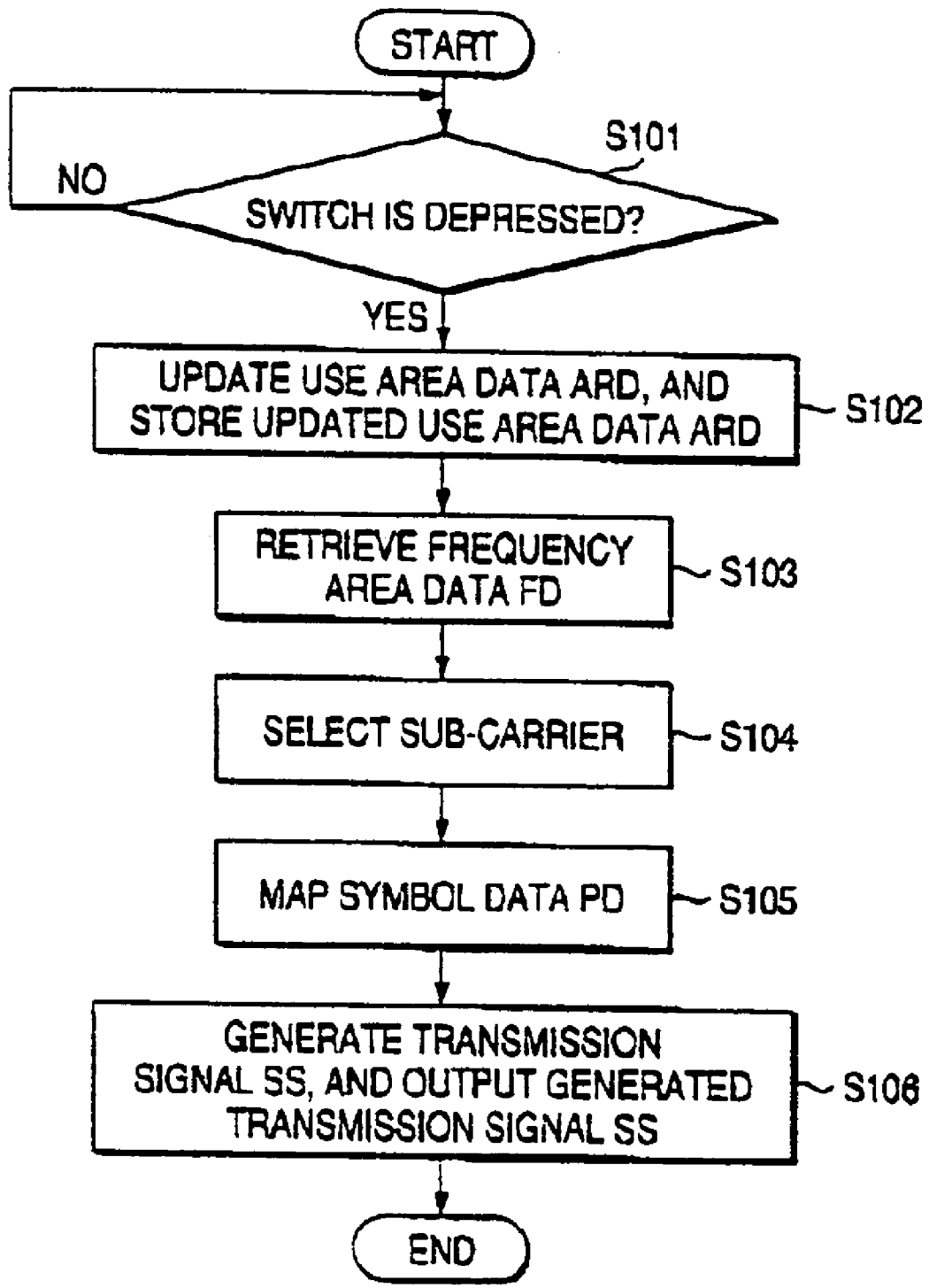
FIG. 12 is a flow chart for describing one example of a communication operation executed by the PLC adaptor.

Subsequently, a description is made as to a changing/setting process operation of the frequency band "Δf" with reference to FIG. 1, FIG. 6, and FIG. 10 to FIG. 12. FIG. 10 is an explanatory diagram for explaining an example of control operation for selecting a sub-carrier SC. FIG. 11 is a diagram for graphically representing an example of a frequency spectrum in the case that the frequency band "Δf" is changed and the charged frequency band "Δf" is set. FIG. 12 is a flow chart for describing an example of communication operations executed by the PLC adaptor 1.

In this process operation, it is so assumed that the PLC adaptor 1 is moved from the area AR1 to the area AR2 (for example, from Japan to USA), and the home-use network 600 operable by way of the power line communication shown in FIG. 1 is again arranged in this area AR2. As previously explained, while the switch 11 has been provided in this PLC adaptor 1, since the user of the PLC adaptor 1 depresses this switch 11 (step S101 of FIG. 12), the use area of the PLC adaptor 1 may be designated.

In other words, when the user of the PLC adaptor 1 depresses the switch 11 ("YES" of step S101 of FIG. 12) so as to input such a signal for designating the area AR2 corresponding to the use area to this PLC adaptor 1, the CPU 9 updates the use area data ARD stored in the transmitter memory 10 from the area AR1 into the area AR2 indicated by the entered signal, and then, stores this updated use area data ARD into the transmitter memory 10 (step S102 of FIG. 12).

It should also be noted that since the switch 11 corresponds to a manually operable mechanical switch, for example, a membrane switch (seat switch) and the like may be alternatively applied to this switch 11. However, if a manually operable switch is employed, this switch 11 need not always be constructed of such a membrane switch. While various sorts of switches may be applied to this switch 11, for example, a dip switch may be alternatively employed. Since the changing/setting process operation of the frequency band is normally carried out only during the initial setting operation, it is preferable to employ such a dip switch as this switch 11, which is made compact and is not manipulated in a careless manner. Also, if an erroneous manipulation preventing cover is provided on this switch 11, then a similar effect may be achieved.

When the use area date ARD is updated as the area data AR2 and this area data AR2 is stared, the controller 8 reads out the use area data ARD stored in the transmitter memory 10, and then, retrieves such a frequency data FD from the transmitter memory 10, which corresponds to the area AR2 indicated by this read use area data ARD (step S103 of FIG. 12). As indicated in FIG. 6, since the frequency data FD corresponding to the area AR2 corresponds to FD2, the controller 8 retrieves frequency band data FD2 from the transmitter memory 10 as indicated in FIG. 5. Also, as shown in this drawing, since the retrieved frequency band data FD2 indicates the frequency band "Δf2", the controller 8 issues such an instruction to the mapping unit 51 of the transmitter 5 in such a manner that the mapping unit 51 selects such a sub-carrier SC corresponding to this frequency band Δf2 from the four sub-carriers of SC1, SC2, SC3, and SC4 (step S104 of FIG. 12). In this example, it is so assumed that the sub-carriers corresponding to the frequency band Δf2 are "SC2" and "SC3". That is to say, these sub-carriers of SC3 and SC3 are selected.

Concretely speaking, as to such a case that symbol data PD of "+1", "+3", "−3", "−1", - - - are produced, the updating/changing process operation of the frequency band will now be explained with reference to FIG. 10. When the mapping unit 51 outputs the symbol data "PD" in this order of "+1", "+3", "−3", "−1", - - -, the controller 8 inputs zero with respect to the mapping unit 51 in order that the symbol data PD is not entered to the input units 52A1 and 52A4 which correspond to the sub-carriers SC1 and SC4 which have not be selected (step S105, of FIG. 12), as indicated in FIG. 10. As a concequence, as indicated in FIG. 10, the mapping unit 51 may input the symbol data PD of "+1", "−3", - - -, into the input unit 52A2, and also, may input the symbol data PD of "+3", "−1", - - -, into the input unit 52A3. In other words, the mapping unit 51 maps the symbol data PD only to the selected sub-carriers of SC2 and SC3.

It should also be understood that in FIG. 10, only the symbol data PD of "+1" and "−3" entered to the input unit 52A2, and the symbol data PD of "+3" and "−1" entered to the input unit 52A3 among the entered symbol data PD are indicated. Also, since the symbol data PD are sequentially allocated to a plurality of sub-carriers SC, a highspeed data communication ray be realized. Alternatively, the same symbol data PD may be allocated to a plurality of different sub-carriers SC, and the resultant symbol data PD may be transmitted. As a consequence, a data communication having higher reliability may be carried out.

The inverse transforming unit 52B performs a wavelet inverse transforming operation with respect to the respective symbol data PD which have been mapped only to the sub-carriers SC2 and SC3, and the transmitters outputs the transmission signal SS to which a similar process operation to the above-explained process operation has been carried out to the power line 2 (step S106 of FIG. 12). As previously explained, since the sub-carriers SC2 and SC3 corresponding to the frequency band "$\Delta f2$" are selected as the sub-carrier SC, the frequency band "$\Delta f$" of the outputted transmission signal SS has been changed from "$\Delta f1$" to "$\Delta f2$" and the changed frequency band "$\Delta f2$" has been set.

When the frequency band "$\Delta f$" is changed to be set in the above-described manner, the frequency spectrum of the transmission signal SS is controlled within such a range of a frequency spectrum which may be used in the area AR2. Concretely speaking, for example, as indicated in FIG. 11, in such a case that a frequency spectrum "$SP_{AR}$" (indicated by broken line) which can be used in the area AR2 owns restricted regions "LA1" and "LA2" in the frequency of, for example, 0.02 to 0.35 Krad/s, the output power is controlled within the range of the above-described frequency spectrum "$SP_{AR}$" in a frequency spectrum "$SP_{SS}$" (indicated by solid line) of the transmission signal SS. It should also be noted that for the sake of simple explanations, since the total number of the sub-carriers SC has been explained as 4 sub-carriers, both the sub-carriers SC2 and SC3 are not made coincident with the frequency spectrum "$SP_{SS}$" shown in FIG. 11.

As previously explained, even when the use area of the PLC adaptor 1 is changed from the area "AR2" to another area (for example, "AR3"), the changing/setting process operation of the frequency band "$\Delta f$" is carried out in a similar manner to the above-explained manner, so that the frequency spectrum "$SP_{SS}$" of the transmission signal SS may be controlled with such a range of the frequency spectrum "$SP_{AR}$" which can be used in the respective areas "AR."

As previously explained, in the home-use network 600 according to this embodiment mode 1 of the present invention, since the frequency data FD is retrieved, the frequency band "$\Delta f$" of the transmission signal SS which has been set is changed to such a frequency band "$\Delta f$" which should be newly set, and this changed frequency band "$\Delta f$" is set. As a result, even in such a case that the frequency band "$\Delta f$" which should be set is changed, the frequency band "$\Delta f$" of the transmission signal SS may he readily changed without additionally providing a band injection filter, namely while the circuit arrangement of the communication apparatus is not changed. As a consequence, even when the restricted content is changed due to the alteration of the law, and/or even in such a case that the use area of the communication apparatus is changed, the communication apparatus can be properly adapted to the change of the frequency band $\Delta f$ which should be set in the flexible manner.

Also, since the communication apparatus can be properly adapted to the change in the frequency band $\Delta f$ which should be set in the flexible manner without additionally employing the band rejection filter, even when the communication apparatus is arranged in such a manner that this communication apparatus can be used is a plurality of areas AR, such band rejection filters whose filter coefficients are different from each other with respect to each of the areas "AR" (for example, every country) are no longer prepared. As a result, it is possible to avoid that the circuit scale as to the communication apparatus is increased. Also, in the case that the communication apparatus is operated in a high speed, it can avoid that power consumption is increased because the band rejection filter is additionally provided.

Also, since the frequency band $\Delta f$ as to the transmission signal SS outputted via the power line 2 can be readly changed, even when various sorts of limitations are additionally conducted to the restricted contents related to the frequency bands and the allowable electric field strengths, the communication apparatus can be properly adapted to these restricted contents in the flexible manner. As a result, even in such a case that the communication apparatus uses such frequency bands which are utilized in the presently existing communication systems such as, for example, amateur radio communications and shortwave broadcasting systems, the interference with respect to these presently existing communication systems can be firmly prevented.

Further, since the frequency band $\Delta f$ of the transmission signal SS is changed and set by utilizing the OFDM (orthogonal Frequency Division Multiplex) modulating method with employment of the wavelet inverse transformation, such a calculation process that a complex number calculation is required in a Fourier inverse transformation can be carried out only by a real number calculation, so that a total calculation process amount can be reduced, as compared with that of the or OFDM modulating method using the Fourier inverse transformation. As a consequence, the circuit scale as to the communication apparatus can be reduced.

It should also be understood that the transforming method between the time domain and the frequency domain need not be always limited only to the wavelet transforming method, but, for example, the Fourier transforming method may be employed. Although the OFDM modulating method has been described as the modulating method, the present invention is not especially limited thereto. For example, the spread spectrum modulating method may be alternatively used as the modulating method.

In the above-described embodiment mode 1, such a process operation for changing the frequency based $\Delta f$ has been described, but the present invention is not limited only to this process operation, if such a characteristic value indicative of a physical characteristic as to the transmission signal SS is changed. For instance, a power level of the transmission signal SS maybe alternatively changed. In this alternative case, while data indicative of power levels are previously stored in the frequency band table FDT shown in FIG. 6 in connection with the frequency band Δf, when the use area data ARD is updated to be stored, the controller 8 may retrieve such a data indicative of the power level corresponding to the use area data ARD, and then, may issue such in instruction to the amplifier 54 of the transmitter 5 in such a way that the power level of the transmission signal SS is changed into this retrieved power level. Upon receipt of this instruction, the amplifier 54 controls the outputted transmission waveform to be fitted to the changed power level.

Figure 13:
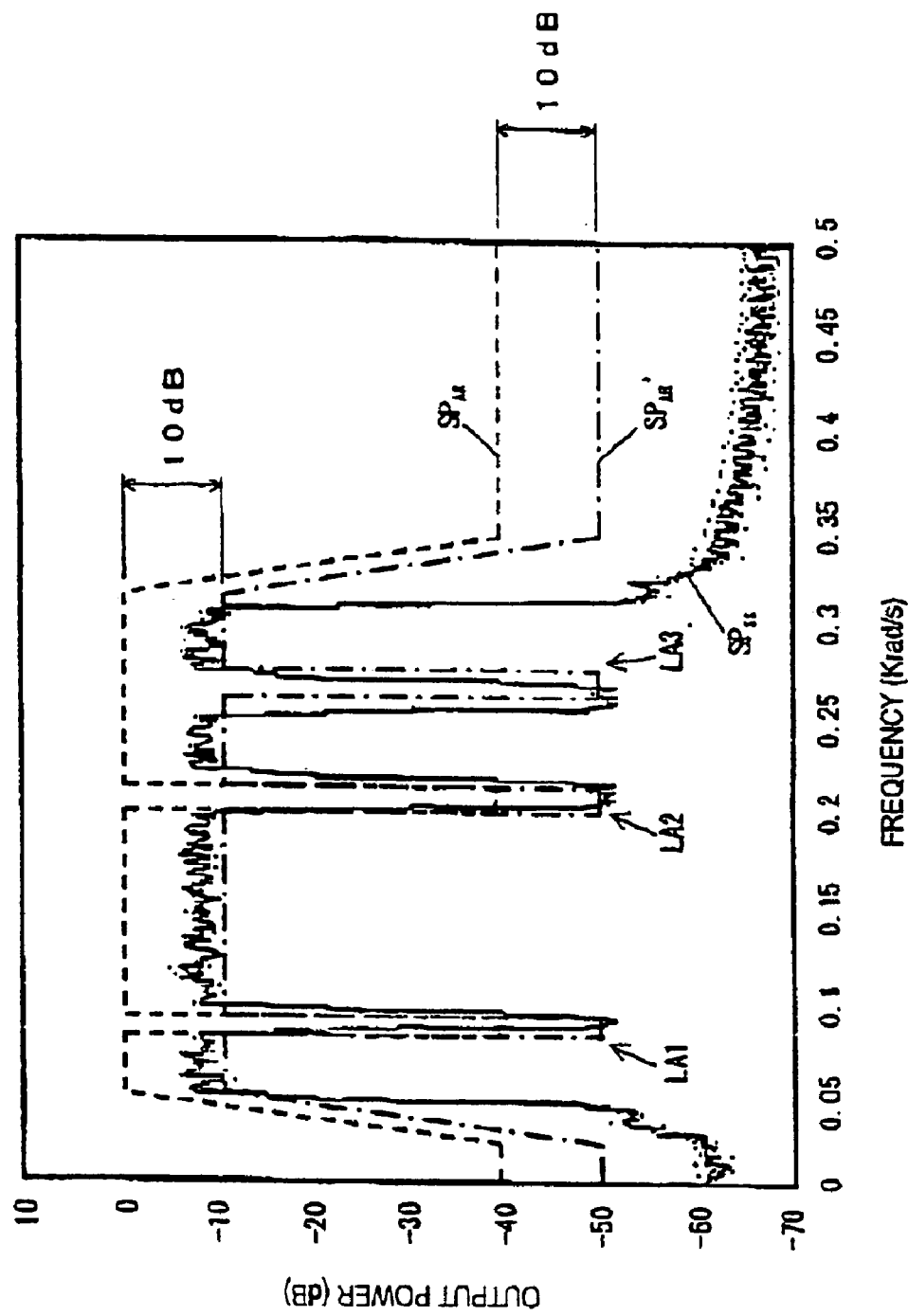
FIG. 13 is a diagram for graphically representing one example of a frequency spectrum, in the case that a frequency band and output power are changed to be set.

It is so assumed that a usable frequency spectrum has been changed from the frequency spectrum "$SP_{AR}$" indicated by the broken line of FIG. 13 into another frequency spectrum "$SP_{AR}$'" denoted by a dot and dash line of FIG. 13. This frequency spectrum $SP_{AR}$' corresponds to such a frequency spectrum that a new restricted region LA3 is provided in the first-mentioned frequency spectrum $SP_{AR}$, and furthermore, output power of the entire frequency spectrum $SP_{AR}$ is lowered by 10 dB. As previously described, even in such a case that not only the frequency spectrum, but also the output power are changed as the usable characteristic value, as explained above, the power level is changed in combination with the frequency band "Δf." As a result, as indicated in FIG. 13, the frequency spectrum $SP_{SS}$ (indicated by solid line) of the transmission signal SS is controlled within the range of the frequency spectrum $SP_{AR}$'.

It should also be understood that the embodiment mode 1 has described such a case that the frequency band Δf is changed based upon the frequency band table FDT shown in FIG. 6. However, in accordance with the present invention, the frequency band table FDT need not be always and previously stored. Alternatively, for example, the user of the PLC adaptor 1 may input the frequency band data FD from an input means (for instance, ten-numeral entry key) provided in the PLC adaptor 1. In this alternative case, the above-explained switch 11 is not especially required. Also, the above-described input means need not be always provided with the PLC adaptor 1, but the frequency band data FD may be alternatively entered from, for example, another input means (for example, keyboard) provided on the electric appliance 3.

It should also be understood that in the above-described embodiment mode 1, the PLC adaptor 1 has been described as one example of the communication apparatus 1. Alternatively, if such an apparatus having a transmission function is available, then any type of apparatus may be used. For example, a semiconductor element equipped with the transmission function may be alternatively employed. Further, any electric appliances (personal computer, printer, copymachine telephone, facsimile etc.) having the transmission functions may be alternatively employed. It should also be noted that domestic electric appliances (namely, so-called "network domestic electric appliances" such as television and DVD [Digital Versatile Disk] recorder) equipped with the transmission function may be involved by each electric appliances. Since the above-explained various structural modes are utilized, user friendly commercial products may be provided to users.

(Embodiment Mode 2)

Figure 14:
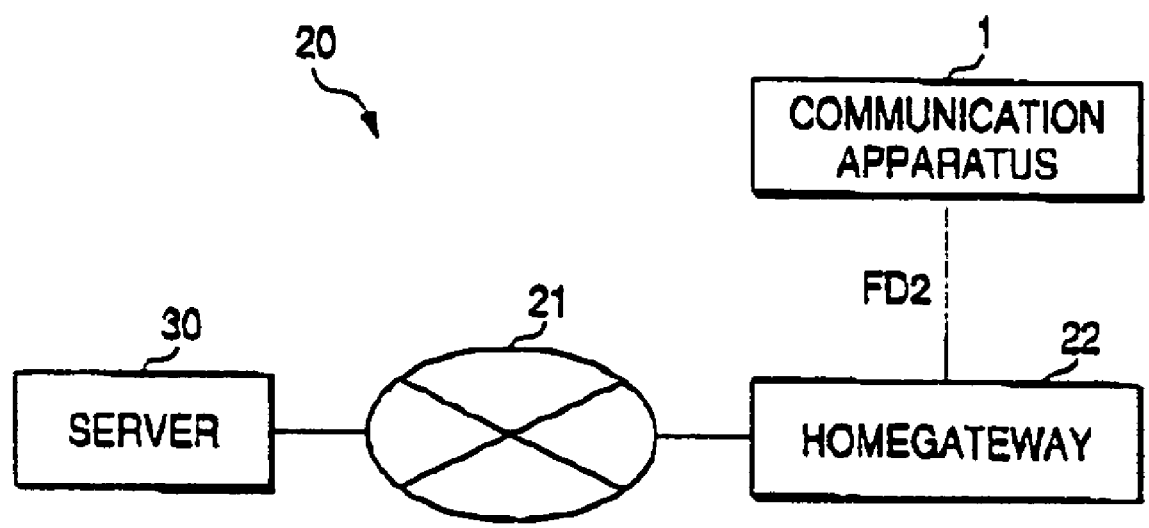
FIG. 14 is a system diagram for showing an example or a communication system.

Next, a description is made of a communication system according to an embodiment mode 2 of the present invention. FIG. 14 is a system diagram for indicating an example of a communication system 20 as the embodiment mode 2. As indicated in FIG. 14, the communication system 20 has contained both a server 30 and a homegateway 22 which have been connected to a network 21 such as the Internet connected network, and also, has contained a communication apparatus 1 which has been connected to the homegateway 22. It should be understood that an arrangement of the communication apparatus 1 is the same arrangement as the above-described PLC adaptor 1 shown in FIG. 5, and explanations thereof are omitted. Also, both the power line 2 and the electric appliance 3 have been omitted in FIG. 14.

Figure 15:
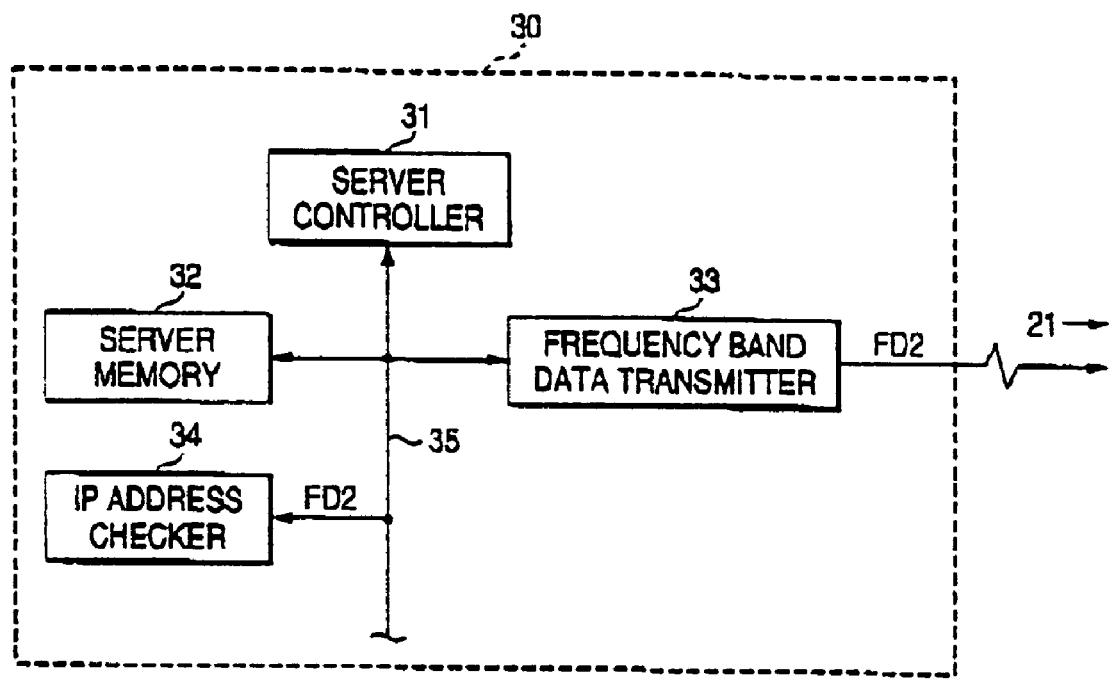
FIG. 15 is a functional block diagram for representing one example of a server.

FIG. 15 is a functional block diagram for representing an example of the server 30. As indicated in a broken line frame of FIG. 15, the server 30 has contained a server controller 31, and this server controller 31 has been connected via a bus line 35 to a server memory 32, a frequency band data transmitter 33, and an IP address checker 34. The frequency band data transmitter 33 has been connected to the network 21. Different from the embodiment mode 1, in this embodiment mode 2, the frequency band table FDT show in FIG. 6 is not stored in the transmitter memory 10 of the PLC adaptor 1, but has been previously stored in the server memory 32 of the sever 30.

It should also be noted that both the server controller 31 and the IP address checker 34 may be realized by an IC (Integrated Circuit) which constitutes a CPU (Central Processing Unit); the server memory 32 may be realized by such a memory as a ROM and a RAM; and the frequency band data transmitter 33 may be realized by a modem which converts a digital signal into an analog signal. Further, the frequency band data transmitter 33 may function as one example of a characteristic value transmitter, and the IP address checker 34 may function as one example of a gateway area information checker.

With employment of the above-explained arrangement, a changing/setting process operation of a frequency band "Δf" by the communication system 20 will now be described with reference to FIG. 1, FIG. 5, FIG. 6, FIG. 14, and FIG. 16. FIG. 16 is a diagram for indicating one example of contents of an address table ADT.

It should be assumed that the communication apparatus 1 has been used in the area AR1 similar to the above-described embodiment mode 1, and "IPA1" has boon set as an IP address "IPA" of the PC (personal computer) 3B connected to the communication apparatus 1. This IP address "IPA" corresponds to, for example, an address which is defined based upon IPv4 (Internet Protocol Version 4). Since such an IP address IPA is arranged by a 32-bit sequence, approximately 43 million pieces of combined sequences are present in total, and IP addresses of a specific range have been allocated to each of areas AR such as countries (for instance, IP addresses defined from "194.0.0.0" through "195.255.255.255" have been allocated to North America) by such an institute as IANA (Internet Assigned Numbers Authority).

In this case, similar to the embodiment mode 1, it is so assumed that the communication apparatus 1 is moved from the area "AR1" to the area "AR2", and the, the home-use network 600 operable by the power line communication (PLC) shown in FIG. 1 is again constructed in this area "AR2." In this case, since the PC 3B has been moved to the area "AR2", it is so assumed that a DHCP (Dynamic Host Configuration Protocol) sever (not shown) has changed the IP address "IPA1" into another IP address "IPA2" different from the above IP address "IPA1" selected from the IP addresses "IPA" allocated to the area "AR2", and then, has set this IP address "IPA2" with respect to the PC 3B.

The IP address checker 34 of the server 30 monitors the IP address IPA set to the PC 3B. In the case that this IP address IPA is changed to be set, this IP address checker 34 refers to the IP address of the PC 3B via the network 21 so as to read out the use area of the communication apparatus 1. Also, as represented in FIG. 16, an address table "ADT" which indicates the ranges of the IP address IP corresponding to the respective areas AR1, AR2, AR3, - - - , has been stored in the server 30.

In other words, as previously explained, since the IP address "IPA1" of the PC3B has been changed into the IP address "IPA2" and this changed IP address "IPA2" has been set, the IP address checker 34 refers to the address table ADT which has been stored in the server 30 so as to read out the area "AR2" as such an area "AR" which corresponds to the range or the IP address containing the IP address "IPA2" (namely, as "use area"). When this area "AR2" is read out, the IP address checker 34 reads out such a frequency band data FD corresponding to this read area AR2 from the frequency band table FDT (refer to FIG. 6) which has been stored in the server memory 32. While the frequency band data FD corresponding to the area AR2 is "FD2", as shown in FIG. 14, the frequency band data transmitter 33 transmits the read frequency band data FD2 via both the network 21 and the homagateway 22 to the CPU 9 of the communication apparatus 1.

The CPU 9 shown in FIG. 5 stores the transmitted frequency band data FD2 into the transmitter memory 10 of the communication apparatus 1. When this frequency band data FD2 is stored, the controller 8 retrieves the frequency band data FD2 from the transmitter memory 10. Since the acquired frequency band data FD2 indicates the frequency band "Δf2", similar to the embodiment mode 1, the controller 8 issues an instruction to the mapping unit 51 of the transmitter 5 in such a manner that sub-carriers SC2 and SC3 corresponding to the frequency band Δf2 are selected from, for example, 4 sets of the sub-carriers SC1, SC2, SC3, and SC4. As a consequence, similar to the embodiment mode 1, the frequency band Δf of the transmission signal SS has been changed from "Δf1" to "Δf2" to set the changed frequency band "Δf2." It should also be noted that since communication operation of the communication apparatus 1 of this embodiment mode 2 is similar to that of the embodiment mode 1, explanations thereof are omitted.

As previously explained, in the communication system according to the embodiment mode 2 of the present invention, in such a case that the IP address "IPA" indicative of the use area of the communication apparatus 1 has been updated, since the frequency band "Δf" of the transmission signal SS is changed to be set, the server 30 can automatically change the frequency band "Δf" to set the changed frequency band "Δf" without requiring the cumbersome operation by the user of the communication apparatus 1, which is different from the above-explained embodiment mode 1.

Also, the server 30 stores the frequency band table FDT and transmits the frequency band data FD corresponding to the use area of he communication apparatus 1 to the communication apparatus 1, so that the frequency band "Δf" as to the respective areas "AR" can be managed on the side of the server 30, As a consequence, for instance, since the latest frequency band Δf in each of the areas AR is prepared, even in such a case that the restricted content is changed in connection with the alteration of the law, the present frequency band can be changed so as to set a proper frequency band "Δf."

In the above-described embodiment mode 2, the IP address "IPA" has been described as one example of the area information indicative or the use area or the communication apparatus 1. However, the present invention is not always limited only to this IP address IPA. Also, the IP addresses are not always limited only to such IP addresses which have been especially defined by IPv4, but may be alternatively realized by such addresses which have been defined by IPv6 (Internet Protocol Version 6).

Although the embodiment mode 2 has explained such a case that the server 30 monitors the IP address IPA of the electric appliance 3, the present invention is not limited thereto. Alternatively, the communication apparatus 1 may monitor the IP address IPA of the electric appliance 3. In this alternative case, if both the frequency band table FDT and the address table are stored in the communication apparatus 1, then the server 30 is no longer required. Furthermore, while the server 30 does not directly monitor the IP address IPA of the electric appliance 3, this server 30 may alternatively monitor an IP address "IPA" of another communication apparatus (for instance, gateway) to which the IP address IPA corresponding to the use area of the communication apparatus 1 in order to monitor the IP address IPA of the electric appliance 3.

Figure 17:
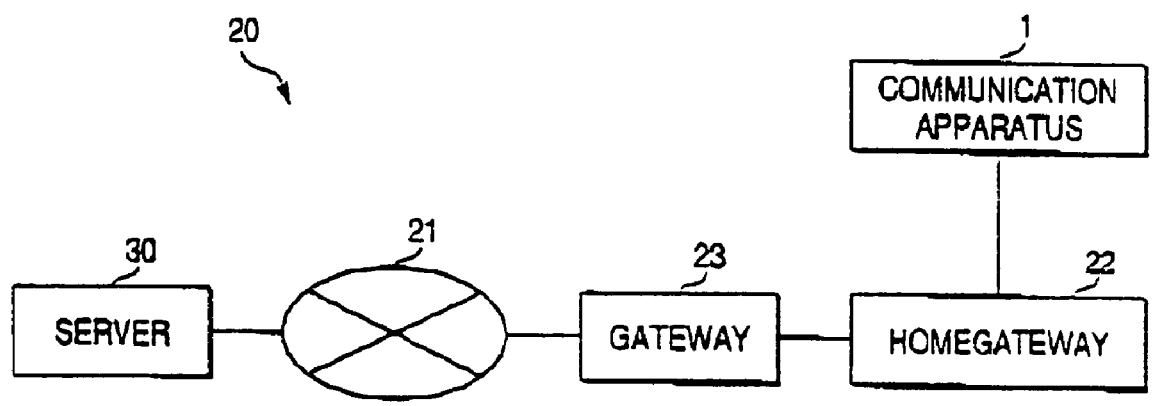
FIG. 17 is a system diagram for representing one example of the communication system in the case that a gateway is connected.

FIG. 17 is a system diagram for showing one example of a communication system 20 in such a case that an IP address of a gateway is monitored. This communication system 20 of FIG. 17 is made different from the communication system 20 shown in FIG. 14, and a homegateway 22 has been connected via a gateway 23 to a network 21, and further, an IP address checker 34 of the server 30 monitors an IP address IPA set to the gateway 23.

In this case, similar to the embodiment mode 2, it is so assumed that when the communication apparatus 1 is moved from the area "AR1" to the area "AR2", and then, the home-use network 600 operable by the power line communication (PLC) shown in FIG. 1 is again constructed in this area "AR2", a gateway which relays the communication apparatus 1 to the network 21 becomes the gateway 23. Since this gateway 23 belongs to the area "AR2", the IP address "IPA" of the gateway 23 is changed from "IPA1" to "IPA2" and this changed IP address "IPA2" is set in a similar manner to the IP address IPA of the electric appliance 3.

Similar to the above embodiment mode, the address checker 34 of the server 30 refers to the IP address "IPA2" which has been set to the gateway 23 via the network 21, and then, reads out the area "AR2" as the use area of the communication apparatus 1. As a consequence, similar to the above embodiment mode, the IP address checker 34 acquires the frequency band data FD2, and then, the frequency band data transmitter 33 of the server 30 transmits the retrieved frequency data FD2 via the network 21, the gateway 23, and the homegateway 22 to the CPU 9 of the communication apparatus 1. As a result, the frequency band "Δf" of the transmission signal SS is chanced from "Δf1" to "Δf2", and the changed frequency band "Δf2" is set in a similar manner to the above embodiment mode. Accordingly, the area information which indicates the use area of the communication apparatus 1 need not monitor the communication apparatus 1, so that the degree of freedom as to the monitoring subject can be widened.

It should also be understood that in the above-explained embodiment mode 2, such a process operation for changing the frequency band Δf has been described, but the present invention is not limited only to this process operation similar to the embodiment mode 1, if such a characteristic value indicative of a physical characteristic as to the transmission signal SS is changed. Also, in the above-described embodiment mode, the PLC adaptor 1 has bean described as one example of the communication apparatus 1. Alternatively, if such an apparatus having a transmission function is available, then any type of apparatus may be used.

Although the arrangements of FIG. 14 and FIG. 17 .have been disclosed as one example of the communication system 20 in the above-explained embodiment mode 2, the present invention is not limited only to these arrangements. Also, as to the network, if the communication apparatus 1 can be freely connected thereto, then the present invention need not be limited only to the Internet connected network. For instance, an unified digital communication network such as ISDN (Integrated Services Digital Network), an international public network, a cable modem network, a DSL (Digital Subscriber Line) modem network, an FTTH (Fiber to the Home), or such an intranet network which has been individually constituted within an enterprise may be employed as the above-explained network. Furthermore, as to the Internet connected network, if an IP (Internet Protocol) layer in an OSI (Open System Interconnection) can be provided, then either an open type broadband network or an intranet network which has been individually constituted within an enterprise may be employed. Also, no specific restriction is required for a physical layer, a data link layer, and a network layer.

Further, as to the connecting means between the communication apparatus 1 and the network 21 in the communication system 20, if the communication apparatus 1 may be connected to the network 21 by employing at least one of a power line, a copper wire, a twisted wire, a coaxial cable, a wireless line, Ethernet (registered trademark), a telephone line, and the like, then any of these connecting means may be employed, and both sorts of physical layers of interfaces and total quantities thereof are not limited.

The present invention can be applied to a transmission apparatus for outputting input data as a transmission signal, a transmission method, and a communication system. For instance, even in such a case that a restricted content is changed in connection with an alteration of a law, and even when a use area of a transmission apparatus is changed, the transmission apparatus, the transmission method, and the communication system, according to the present invention, can be properly adapted to a change in characteristic values to be set in a flexible manner.

This application is based on and claims the benefit of priority of Japanese Patent Application No. 2004-214059 filed on Jul. 22, 2005, the content of which is incorporated herein by references in its entirety.

What is claimed is:

1. A transmission apparatus for outputting input data as a transmission signal, comprising:
    a characteristic value determinator for setting a characteristic value indicative of a physical characteristic of the transmission signal in accordance with characteristic value information including a set of predetermined characteristic values stored in a memory;
    a transmitting signal generator for generating the transmission signal having the characteristic value set by the characteristic value determinator from the input data, and for outputting the generated transmission signal;
    a characteristic value obtaining section that obtains, from said memory, characteristic value information indicative of another characteristic value of said set of predetermined characteristic values; and
    a characteristic value modificator for controlling the characteristic value determinator in such a manner that the characteristic value set by the characteristic value determinator is changed into said another characteristic value indicative of the characteristic value information obtained by the characteristic value obtaining section so as to set said another characteristic value.

2. The transmission apparatus according to claim 1, wherein:
    the characteristic value determinator sets a frequency band of the transmission signal;
    the transmitting signal generator is comprised of:
    a sub-carrier selector for selecting at least one of a sub-carrier within the frequency band set by the characteristic value determinator;
    a bit-data generator for generating a plurality of bit data from the input data; and
    a symbol mapper for mapping the respective bit data generated by the bit-data generator as digital modulated symbols with respect only to the sub-carrier selected by the sub-carrier selector; and
    the transmitting signal generator generates the transmission signal, and outputs the generated transmission signal based on the digital modulated symbols mapped by the symbol mapper;
    the characteristic value obtaining section obtains characteristic value information indicative of another frequency band; and wherein:
    the characteristic value modificator controls the characteristic value determinator in such a manner that the frequency band set by the characteristic value determinator is changed into another frequency band indicative of the characteristic value obtained by the characteristic value obtaining section so as to set the changed frequency band.

3. The transmission apparatus according to claim 2 wherein:
    the transmitting signal generator is further comprised of:
    a wavelet inverse transformer for wavelet-transforming the digital modulated symbols mapped by the symbol mapper temporal waveform series data; and
    the transmitting signal generator generates the transmission signal from the temporal waveform series data generated by the wavelet inverse transformer, and outputs the generated transmission signal.

4. The transmission apparatus according to claim 1 wherein:
    the characteristic value determinator sets a power level of the transmission signal;
    the transmission signal generator is further comprised of:
    an amplifier for controlling the power level of the transmission signal to the power level set by the characteristic value determinator; and the transmission signal generator generates a transmission signal having the power level controlled by the amplifier from the input data, and outputs the generated transmission signal;
    the characteristic value obtaining section obtains characteristic value information indicative of another power level; and wherein:
    the characteristic value modificator controls the characteristic value determinator in such a manner that the power level set by the characteristic value determinator is changed into another power level indicated of the characteristic value information obtained by the characteristic value obtaining section.

5. The transmission apparatus according to claim 1 wherein:
    the transmitting signal generator outputs the generated transmission signal via a power line.

6. The transmission apparatus according to claim 1 wherein:

the transmission apparatus is further comprised of:
a transmitter memory for storing thereinto a characteristic value information table which indicates the characteristic value information to correspond to an area; and
the characteristic value obtaining section obtains the characteristic value information which corresponds to the use area of the transmission apparatus from the characteristic value information table.

7. The transmission apparatus according to claim 6, wherein:
the transmission apparatus is further comprised of:
a signal input unit for accepting a signal for designating the use area of the transmission apparatus; and
the characteristic value obtaining section obtains characteristic value information which corresponds to the area designated via the signal input unit from the characteristic value information table.

8. The transmission apparatus according to claim 6 wherein:
the transmission apparatus is further comprised of:
an area information checker for monitoring area information which indicates the use area of the transmission apparatus; and
in the case that the area information of the transmission apparatus monitored by the area information checker is updated, the characteristic value obtaining section obtains characteristic value information which corresponds to an area of the area information from the characteristic value information table.

9. The communication system equipped with a server and the transmission apparatus according to claim 1, which is freely connected to a network, wherein:
the server is comprised of:
a server memory for storing thereinto the characteristic value information table which indicates the characteristic value information to correspond to the area; and
a characteristic value transmitter for reading out the characteristic value information corresponding to the use area of the transmission apparatus from the characteristic value table, and transmits the read characteristic value information to the characteristic information obtaining section of the transmission apparatus.

10. The communication system according to claim 9 wherein:
the transmission apparatus is freely connected via a gateway to the network;
the server is comprised of:
an area information checker for monitoring area information set to the gateway; and
in the case that the area information of the gateway monitored by the area information checker is updated, the characteristic value transmitter of the server reads out characteristic information which corresponds to an area of the area information from the characteristic value table as characteristic value information which corresponds to the use area of the transmission apparatus, and the characteristic value transmitter transmits the read characteristic value information to the characteristic value obtaining section of the transmission apparatus.

11. The transmission apparatus according to claim 1, wherein said memory comprises a first part located in said transmission apparatus and a second part located outside said transmission apparatus.

12. The transmission apparatus according to claim 1, wherein said memory is located in said transmission apparatus.

13. The transmission apparatus according to claim 1, wherein said memory is located outside said transmission apparatus.

14. The transmission apparatus according to claim 1, wherein the characteristic value set by said characteristic value determinator includes at least one of a frequency band of the transmission signal and a power level of the transmission signal.

15. The system according to claim 1, wherein the characteristic value set by said characteristic value determinator includes at least one of a frequency band of the transmission signal and a power level of the transmission signal.

16. A transmission method for operating a transmission apparatus to output input data as a transmission signal, comprising:
setting a characteristic value indicative of a physical characteristic of the transmission signal in accordance with characteristic value information including a set of predetermined characteristic values stored in a memory;
generating from the input data the transmission signal having the set characteristic value;
obtaining from said memory characteristic value information indicative of another characteristic value of said set of predetermined characteristic values; and
changing at the transmission apparatus the set characteristic value into said another characteristic value indicative of the obtained characteristic value information.

17. The transmission method according to claim 16, wherein the characteristic value includes at least one of a frequency band of the transmission signal and a power level of the transmission signal.

18. A transmission apparatus for outputting input data as a transmission signal, comprising:
a characteristic value determinator for setting a characteristic value indicative of a physical characteristic of the transmission signal in accordance with characteristic value information including a set of predetermined characteristic values stored in a memory, said characteristic value information relating to one of different communication standards set by a given country or different communication standards set by different countries;
a transmitting signal generator for generating the transmission signal having the characteristic value set by the characteristic value determinator from the input data, and for outputting the generated transmission signal;
a characteristic value obtaining section for obtaining, from said memory, characteristic value information indicative of another characteristic value of said set of predetermined characteristic values; and
a characteristic value modificator for controlling the characteristic value determinator in such a manner that the characteristic value set by the characteristic value determinator is changed into said another characteristic value indicative of the characteristic value information obtained by the characteristic value obtaining section so as to set said another characteristic value.

19. The transmission apparatus according to claim 18, wherein the characteristic value set by said characteristic value determinator includes at least one of a frequency band of the transmission signal and a power level of the transmission signal.

20. A system comprising:

a computer; and a transmission apparatus for outputting input data as a transmission signal, wherein said transmission apparatus comprises:

a characteristic value determinator for setting a characteristic value indicative of a physical characteristic of the transmission signal in accordance with characteristic value information including a set of predetermined characteristic values stored in a memory;

a transmitting signal generator for generating the transmission signal having the characteristic value set by the characteristic value determinator from the input data, and for outputting the generated transmission signal;

a characteristic value obtaining section for obtaining, based on an input from said computer, characteristic value information indicative of another characteristic value of said set of predetermined characteristic values; and a characteristic value modificator for controlling the characteristic value determinator in such a manner that the characteristic value set by the characteristic value determinator is changed into said another characteristic value indicative of the characteristic value information obtained by the characteristic value obtaining section so as to set said another characteristic value.

* * * * *